(12) United States Patent
Hasson, Jr. et al.

(10) Patent No.: US 11,236,811 B1
(45) Date of Patent: Feb. 1, 2022

(54) CENTER DIFFERENTIAL AND DRIVE SYSTEM FOR FOUR WHEEL DRIVE

(71) Applicant: The Hilliard Corporation, Elmira, NY (US)

(72) Inventors: John Michael Hasson, Jr., Gillett, PA (US); Howard J. Knickerbocker, Cameron Mills, NY (US); James E. Palmer, Elmira, NY (US)

(73) Assignee: The Hilliard Corporation, Elmira, NY (US)

( * ) Notice: Subject to any disclaimer, the term of this patent is extended or adjusted under 35 U.S.C. 154(b) by 0 days.

(21) Appl. No.: 17/136,684

(22) Filed: Dec. 29, 2020

Related U.S. Application Data

(60) Provisional application No. 63/080,443, filed on Sep. 18, 2020.

(51) Int. Cl.
*F16H 48/11* (2012.01)
*F16H 48/34* (2012.01)
*F16H 48/20* (2012.01)
*F16H 48/10* (2012.01)

(52) U.S. Cl.
CPC ............ *F16H 48/34* (2013.01); *F16H 48/11* (2013.01); *F16H 2048/104* (2013.01); *F16H 2048/106* (2013.01); *F16H 2048/202* (2013.01)

(58) Field of Classification Search
CPC .... F16H 48/34; F16H 48/11; F16H 2048/104; F16H 2048/202; F16H 2048/106; F16H 48/14; F16H 48/05
See application file for complete search history.

(56) References Cited

U.S. PATENT DOCUMENTS

| | | | | |
|---|---|---|---|---|
| 1,352,269 A | * | 9/1920 | Indahl | F16H 48/10 475/249 |
| 1,823,092 A | * | 9/1931 | De Lavaud | F16H 48/34 74/650 |
| 1,888,884 A | * | 11/1932 | Omer | F16H 48/08 475/237 |
| 3,388,779 A | * | 6/1968 | Roper | F16D 41/105 192/44 |
| 5,168,956 A | * | 12/1992 | Namioka | B60K 17/3465 180/248 |
| 5,286,239 A | * | 2/1994 | Ito | F16D 41/088 475/231 |
| 5,609,219 A | | 3/1997 | Watson et al. | |
| 5,910,064 A | | 6/1999 | Kuroki | |
| 5,971,123 A | | 10/1999 | Ochab et al. | |
| 6,622,837 B2 | | 9/2003 | Ochab et al. | |
| 6,629,590 B2 | | 10/2003 | Ochab et al. | |

(Continued)

FOREIGN PATENT DOCUMENTS

| | | | | |
|---|---|---|---|---|
| DE | 10139006 A1 | * | 4/2002 | F16D 41/04 |
| JP | H1053036 A | * | 2/1998 | |

*Primary Examiner* — Sherry L Estremsky
(74) *Attorney, Agent, or Firm* — Faegre Drinker Biddle & Reath LLP

(57) ABSTRACT

An on-demand four-wheel drive system includes a differential for the rear axle, a differential for the front axle, and a center differential connecting to the front and rear axle differentials. All three of the differentials contain a bi-directional overrunning roller clutch to enable locking of their respective outputs. The clutches provide a superior on-demand four-wheel drive system that distributes power to each drive wheel to propel the vehicle.

12 Claims, 21 Drawing Sheets

(56) References Cited

U.S. PATENT DOCUMENTS

| | | | |
|---|---|---|---|
| 6,722,484 B2 | 4/2004 | Ochab et al. | |
| 6,755,763 B1 * | 6/2004 | Goto | F16H 48/08 192/35 |
| 6,887,177 B1 * | 5/2005 | Yamada | B60K 17/346 475/203 |
| 7,211,019 B2 | 5/2007 | Kirkwood et al. | |
| 7,276,014 B2 * | 10/2007 | Goto | B60T 8/1755 180/197 |
| 7,591,355 B2 | 9/2009 | Hamrin et al. | |
| 7,654,934 B2 * | 2/2010 | Alfredson | F16H 48/30 477/35 |
| 7,849,988 B2 | 12/2010 | Suzuki et al. | |
| 8,012,057 B2 | 9/2011 | Meixner | |
| 8,452,504 B2 | 5/2013 | Dickinson et al. | |
| 8,641,575 B2 | 2/2014 | Kokubo | |
| 8,825,324 B2 | 9/2014 | Horaguchi et al. | |
| 8,840,514 B1 | 9/2014 | Knickerbcker et al. | |
| 8,857,294 B2 | 10/2014 | Brewer et al. | |
| 8,857,295 B2 | 10/2014 | Tsujimura et al. | |
| 8,857,589 B2 | 10/2014 | Heath et al. | |
| 8,919,513 B2 | 12/2014 | Heath et al. | |
| 8,986,151 B2 | 3/2015 | Valente et al. | |
| 9,022,195 B2 | 5/2015 | Heath et al. | |
| 9,096,125 B2 | 8/2015 | Suzuki et al. | |
| 9,272,620 B2 | 3/2016 | Knickerbocker et al. | |

\* cited by examiner

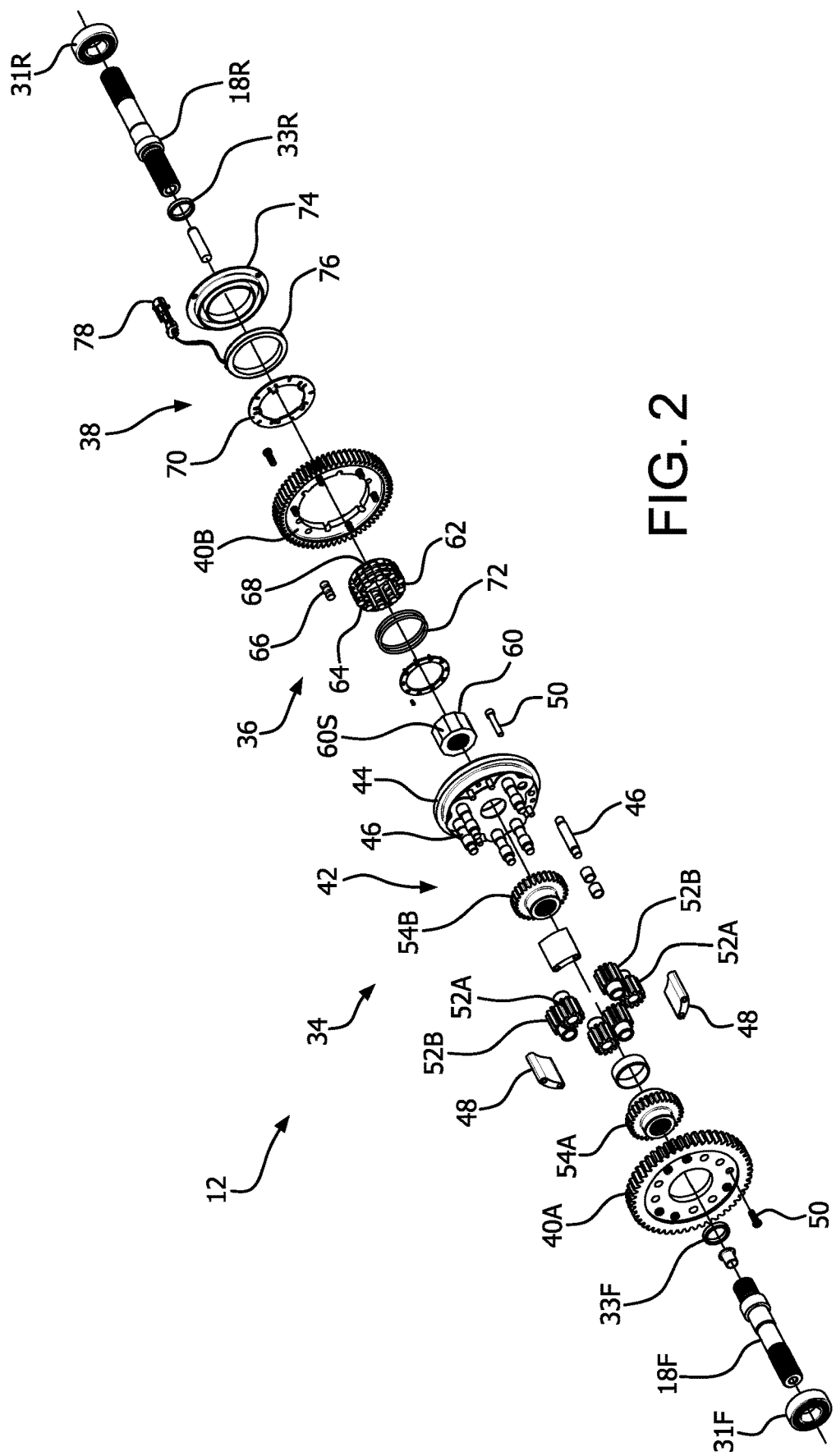

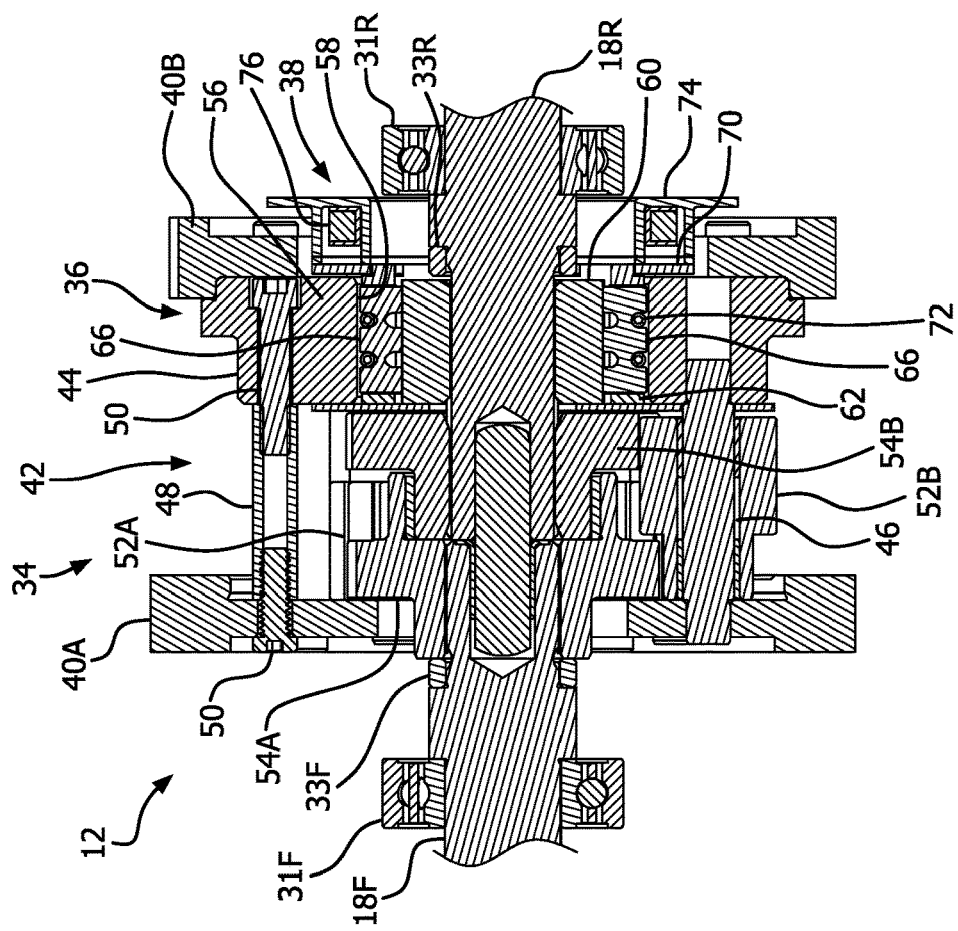
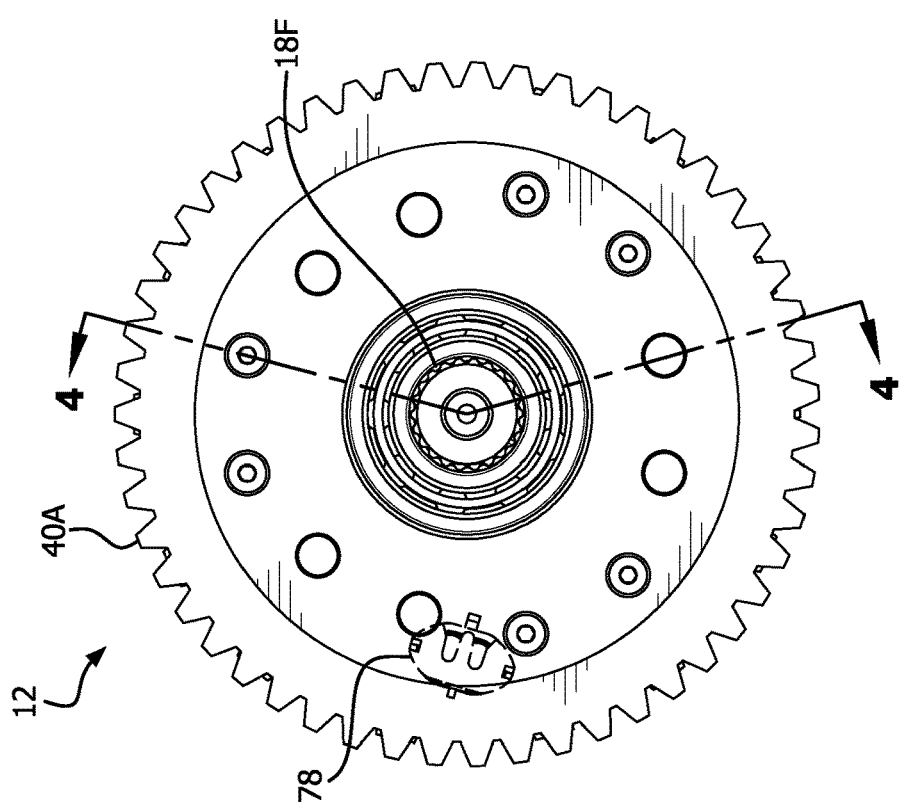
FIG. 4
FIG. 3

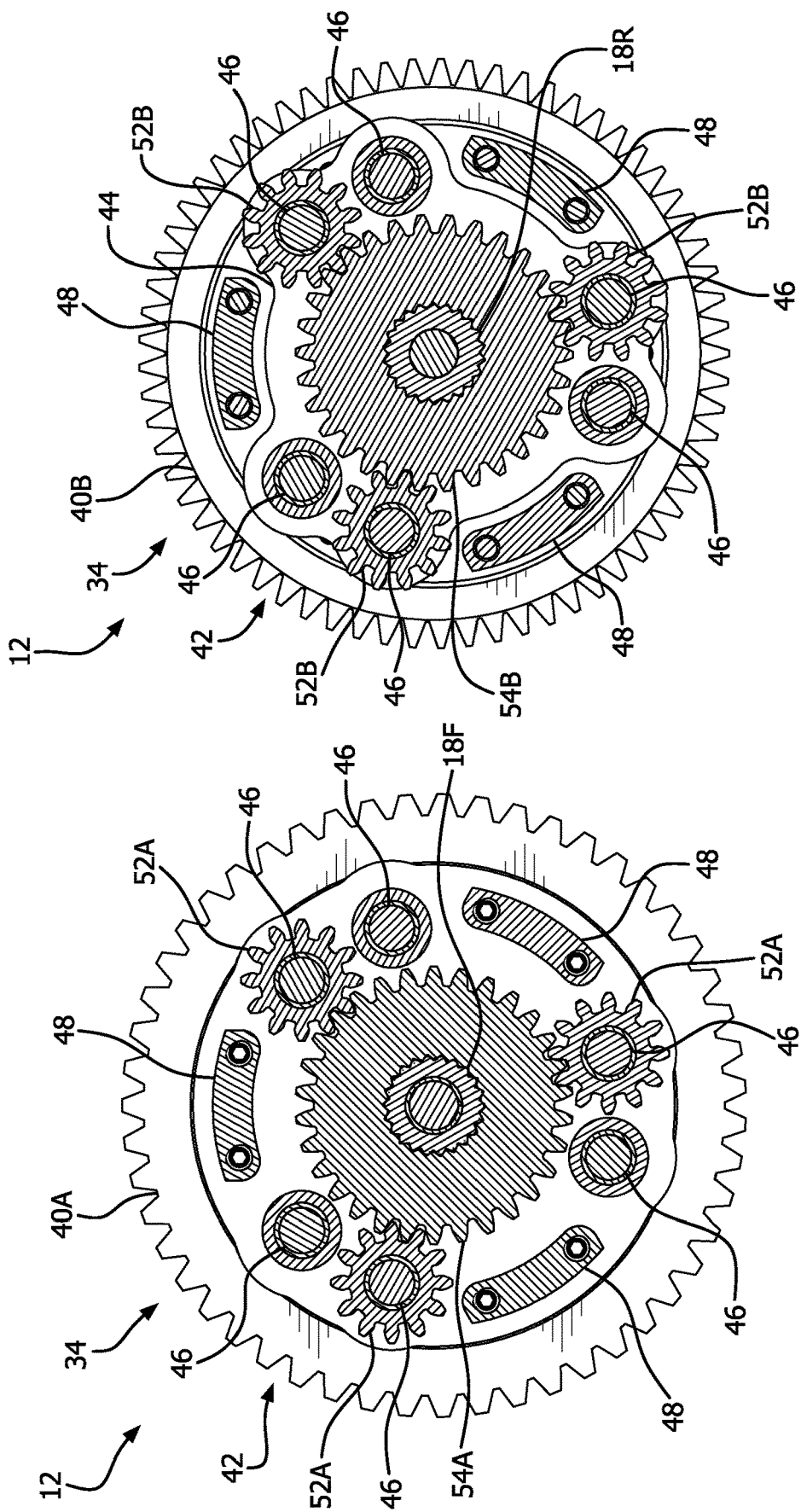

CENTER DIFFERENTIAL AND DRIVE SYSTEM FOR FOUR WHEEL DRIVE

CROSS-REFERENCE TO RELATED APPLICATION

The present application claims priority to and the benefit of U.S. Provisional Application No. 63/080,443, filed Sep. 18, 2020, the disclosure of which is incorporated herein by reference in its entirety.

BACKGROUND OF THE DISCLOSURE

The increased demand in recent years for off-road and all-terrain vehicles has led to tremendous developments in those types of vehicles. Many of the developments have centered around making the vehicle more adaptable to changing road conditions, e.g., dirt roads, pavement and gravel. As the road terrain changes, it is desirable to vary the driving capabilities of the vehicle to more efficiently navigate the new terrain. Prior four-wheel drive and all-terrain vehicles were cumbersome since they required the operator to manually engage and disengage the secondary drive shaft, e.g., by stopping the vehicle to physically lock/unlock the wheel hubs. Improvements in vehicle drive trains, such as the development of automated systems for engaging and disengaging a driven axle, eliminated many of the problems of the prior designs. These automated drive systems are sometimes referred to as "on-the-fly" four-wheel drive. These systems, however, require the vehicle to be in either two-wheel or four-wheel drive at all times.

Generally, all four-wheel drive vehicles include a differential for transferring torque from a drive shaft to the driven shafts that are attached to the wheels. Typically, the driven shafts (or half shafts) are independent of one another allowing differential action to occur when one wheel attempts to rotate at a different speed than the other, for example when the vehicle turns. The differential action also eliminates tire scrubbing, reduces transmission loads and reduces understeering during cornering (the tendency to go straight in a corner). There are four main types of conventional differentials: open, limited slip, locking, and center differentials. An open differential allows differential action between the half shafts but, when one wheel loses traction, all available torque is transferred to the wheel without traction resulting in the vehicle stopping.

A limited slip differential overcomes the problems with the open differential by transferring some torque to the wheel that is not slipping. Some of the more expensive limited slip differentials use sensors and hydraulic pressure to actuate the clutch packs locking the two half shafts together. The benefits of these hydraulic (or viscous) units are often overshadowed by their cost, since they require expensive fluids and complex pumping systems. The heat generated in these systems, especially when used for prolonged periods of time may also require the addition of an auxiliary fluid cooling source.

The third type of differential is a locking differential that uses clutches to lock the two half shafts together or incorporates a mechanical link connecting the two shafts. In these types of differentials, both wheels can transmit torque regardless of traction. The primary drawback to these types of differentials is that the two half shafts are no longer independent of each other. As such, the half shafts are either locked or unlocked to one another. This can result in problems during turning where the outside wheel tries to rotate faster than the inside wheel. Since the half shafts are locked together, one wheel must scrub. Another problem that occurs in locking differentials is twichiness when cornering due to the inability of the two shafts to turn at different speeds.

The final type of differential is a center differential. These types of differentials are used in the transfer case of a four-wheel drive vehicle to develop a torque split between the front and rear drive shafts.

Many differentials on the market today use some form of an overrunning clutch to transmit torque when needed to a driven shaft. One successful use of an overrunning clutch in an all-terrain vehicle is disclosed in U.S. Pat. No. 5,971,123, commonly owned by the assignee of the present invention and incorporated herein by reference in its entirety. In that patent, the vehicle incorporates an overrunning clutch that uses an electromagnetic device for controlling engagement of the four-wheel drive mechanism, and a second electromagnetic device for providing the vehicle with engine braking capability. That patent describes an innovative electro-mechanical bi-directional overrunning clutch differential which addressed many of the problems inherent in the prior drive systems. The bi-directional overrunning clutch differential utilized an electrically controlled coil to advance and/or retard a roll cage, thereby controlling the ability of the differential to engage and disengage depending on the operational state of the primary and secondary wheels. The bi-directional differential in U.S. Pat. No. 5,971,123 also describes a backdrive system. The backdrive system actively engages the secondary shafts in certain situations where extra traction is needed. For example, when the vehicle is driving down a slope the system engages the front wheels, which are the wheels with the better traction.

U.S. Pat. No. 6,722,484 discloses another bi-directional overrunning clutch that is useful on the primary drive axle for providing continuous engagement with overrunning capability, while at the same time providing engine braking capability. The overrunning clutch includes at least one friction member which is in contact with the roll cage and the hub such that, during operation, the friction member generates friction forces between the roll cage and the hub which cause the roll cage to turn with the hub, thus placing the roll cage in the forward-engagement position.

Nevertheless, existing four-wheel drive systems typically suffer from one or more drawbacks. For example, conventional torque vectoring four-wheel drive systems typically require complex and expensive computer controls and sensors. As another example, existing systems can be relatively inefficient, for example, due to heat loss caused by the use of friction clutch plates. As a result, improved four-wheel drive systems would be beneficial.

SUMMARY OF THE INVENTION

In one aspect, the present invention provides an on-demand four-wheel drive system in the field of motor vehicle drivetrains including off-road powersports vehicles. The system includes a differential for the rear axle, a differential for the front axle, and a center differential connecting to the front and rear axle differentials. All three of the differentials contain a bi-directional overrunning roller clutch to enable locking of their respective outputs. The clutches provide a superior on-demand four-wheel drive system that distributes power to each drive wheel to propel the vehicle.

In another aspect, the present invention provides a differential for transmitting power from a transmission to a first shaft and a second shaft in a four-wheel drive vehicle. The differential includes an open differential assembly, a bi-directional overrunning clutch, and an electromagnet assembly. The open differential assembly includes a ring gear, first output gear, and a second output gear. The ring gear is configured to be rotatably driven by the transmission. The first output gear is configured to be rotatably driven by the ring gear, and the first output gear is configured to rotatably drive the first shaft. The second output gear is configured to be rotatably driven by the ring gear, and the second output gear is configured to rotatably drive the second shaft. The open differential has an unlocked configuration and a locked configuration. In the unlocked configuration the open differential permits differentiation between the first output gear and the second output gear, and in the locked configuration the first output gear and the second output gear rotate in combination with each other. The bi-directional overrunning clutch includes a clutch housing, a hub, and a roll cage. The clutch housing is formed on or is coupled to the ring gear and is rotatable in combination with the ring gear, and the clutch housing includes an inner surface. The hub is disposed within the clutch housing and is configured to rotate in combination with the second output gear and the second shaft. The roll cage assembly is disposed between the inner surface of the clutch housing and the hub, and the roll cage assembly includes a roll cage and a plurality of rollers carried by the roll cage. The bi-directional overrunning clutch is engageable to cause the plurality of rollers to wedge between the inner surface of the clutch housing and the hub, and the hub and the clutch housing are thereby rotatable in combination and cause the open differential to occupy the locked configuration. The bi-directional overrunning clutch is disengageable to permit relative rotation between the hub and the clutch housing and thereby permit the open differential to occupy the unlocked configuration. The electromagnet assembly is configured to be energized to cause engagement of the bi-directional overrunning clutch.

In some embodiments, the hub includes a plurality of cam surfaces, and the bi-directional overrunning clutch is engageable to cause the plurality of rollers to wedge between the inner surface of the clutch housing and plurality of cam surfaces of the hub.

In some embodiments, the clutch housing includes a plurality of cam surfaces, and the bi-directional overrunning clutch is engageable to cause the plurality of rollers to wedge between the outer surface of the hub and plurality of cam surfaces of the clutch housing.

In some embodiments, the open differential assembly is a planetary gear assembly, the first output gear is a first sun gear, the second output gear is a second sun gear, and the planetary gear assembly further includes a planetary carrier configured to rotate together with the ring gear. A plurality of posts are carried by the planetary carrier. A plurality of first planetary gears are rotatably carried by the plurality of posts, and the plurality of first planetary gears meshably engage the first sun gear. A plurality of second planetary gears are rotatably carried by the plurality of posts, the plurality of second planetary gears meshably engage the second sun gear, and each of the second planetary gears meshably engages one of the first planetary gears.

In some embodiments, the planetary carrier includes the clutch housing.

In some embodiments, the ring gear is a first ring gear, and the open differential assembly further includes a second ring gear configured to be rotatably driven by the transmission. The second ring gear is configured to rotate together with the first ring gear and the planetary carrier.

In some embodiments, a drive system for a four-wheel drive vehicle includes the differential as a center differential. The center differential is configured to transmit power from the transmission to the first drive shaft and the second drive shaft. The drive system further includes a front differential and a rear differential. The front differential is configured to transmit power from the first drive shaft to a first front driven shaft and a second front driven shaft. The rear differential is configured to transmit power from the second drive shaft to a first rear driven shaft and a second rear driven shaft.

In another aspect, the present invention provides a differential for transmitting power from a transmission to a first shaft and a second shaft in a four-wheel drive vehicle. The differential includes an open differential assembly, a bi-directional overrunning clutch, and an electromagnet assembly. The open differential assembly includes a ring gear, a first output gear, and a second output gear. The ring gear is configured to be rotatably driven by the transmission. The first output gear is configured to be rotatably driven by the ring gear, and the first output gear is configured to rotatably drive the first shaft. The second output gear is configured to be rotatably driven by the ring gear, and the second output gear is configured to rotatably drive the second shaft. The open differential assembly permits differentiation between the first output gear and the second output gear. The bi-directional overrunning clutch includes a clutch housing, a hub, and a roll cage assembly. The clutch housing is formed on or is coupled to the ring gear and is rotatable in combination with the ring gear, and the clutch housing includes an inner surface. The hub is disposed within the clutch housing and is configured to rotate in combination with the second output gear and the second shaft. The roll cage assembly is disposed between the inner surface of the clutch housing and the hub, and the roll cage assembly includes a roll cage and a plurality of rollers carried by the roll cage. The bi-directional overrunning clutch is engageable to cause the plurality of rollers to wedge between the inner surface of the clutch housing and the hub, and the hub and the clutch housing are thereby rotatable in combination and cause the first output gear and the second output gear to rotate in combination with each other. The electromagnet assembly is configured to be energized to cause engagement of the bi-directional overrunning clutch.

In some embodiments, the hub includes a plurality of cam surfaces, and the bi-directional overrunning clutch is engageable to cause the plurality of rollers to wedge between the inner surface of the clutch housing and plurality of cam surfaces of the hub.

In some embodiments, the clutch housing includes a plurality of cam surfaces, and the bi-directional overrunning clutch is engageable to cause the plurality of rollers to wedge between the outer surface of the hub and the plurality of cam surfaces of the clutch housing.

In some embodiments, the open differential assembly is a planetary gear assembly, the first output gear is a first sun gear, and the second output gear is a second sun gear. The planetary gear assembly further includes a planetary carrier, a plurality of posts, a plurality of first planetary gears, and a plurality of second planetary gears. The planetary carrier is configured to rotate together with the ring gear, and the plurality of posts are carried by the planetary carrier. The plurality of first planetary gears are rotatably carried by the plurality of posts, and the plurality of first planetary gears meshably engage the first sun gear. The plurality of second planetary gears are rotatably carried by the plurality of posts, the plurality of second planetary gears meshably engage the second sun gear, and each of the second planetary gears meshably engage one of the first planetary gears.

In some embodiments, the planetary carrier includes the clutch housing.

In some embodiments, the ring gear is a first ring gear, and the open differential assembly further includes a second ring gear configured to be rotatably driven by the transmission. The second ring gear is configured to rotate together with the first ring gear and the planetary carrier.

In some embodiments, a drive system for a four-wheel drive vehicle includes the differential as a center differential. The center differential is configured to transmit power from the transmission to the first drive shaft and the second drive shaft. The drive system further includes a front differential and a rear differential. The front differential is configured to transmit power from the first drive shaft to a first front driven shaft and a second front driven shaft. The rear differential is configured to transmit power from the second drive shaft to a first rear driven shaft and a second rear driven shaft.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 2 is an exploded perspective view of internal components of an embodiment of a center differential of the drive system of FIG. 1, and a housing of the differential is omitted for clarity.

FIG. 3 is an end view of the internal components of the center differential of FIG. 2.

FIG. 4 is a partial side sectional view of the internal components of the center differential along line 4-4 of FIG. 3.

FIG. 8 is a cross-sectional view of the internal components of the center differential along line 8-8 of FIG. 5.

FIG. 9 is a cross-sectional view of the internal components of the center differential along line 9-9 of FIG. 5.

DETAILED DESCRIPTION OF THE DRAWINGS

Figure 1:
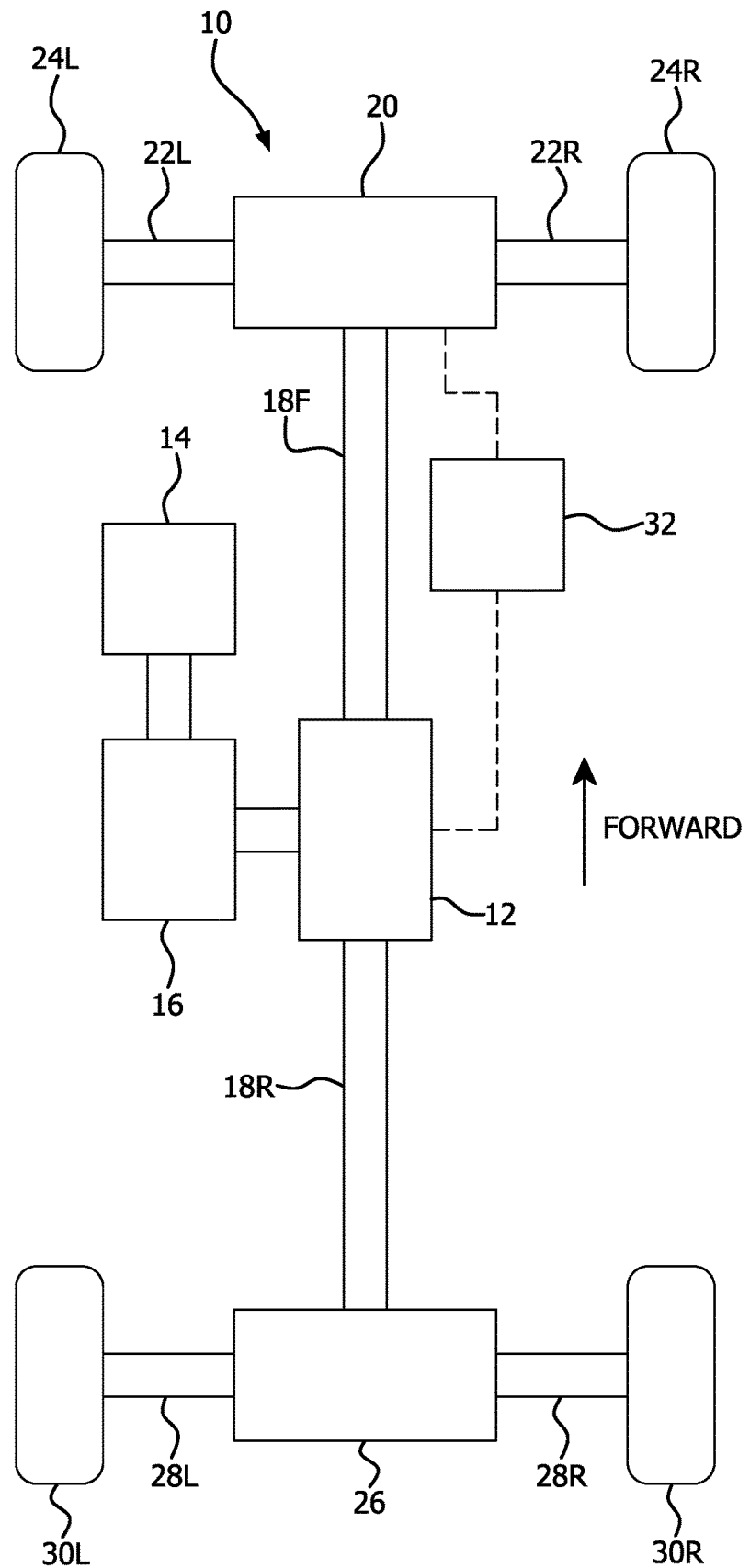
FIG. 1 is a schematic representation of a drive system incorporating a center differential according to an embodiment of the present invention.
Figure 5:
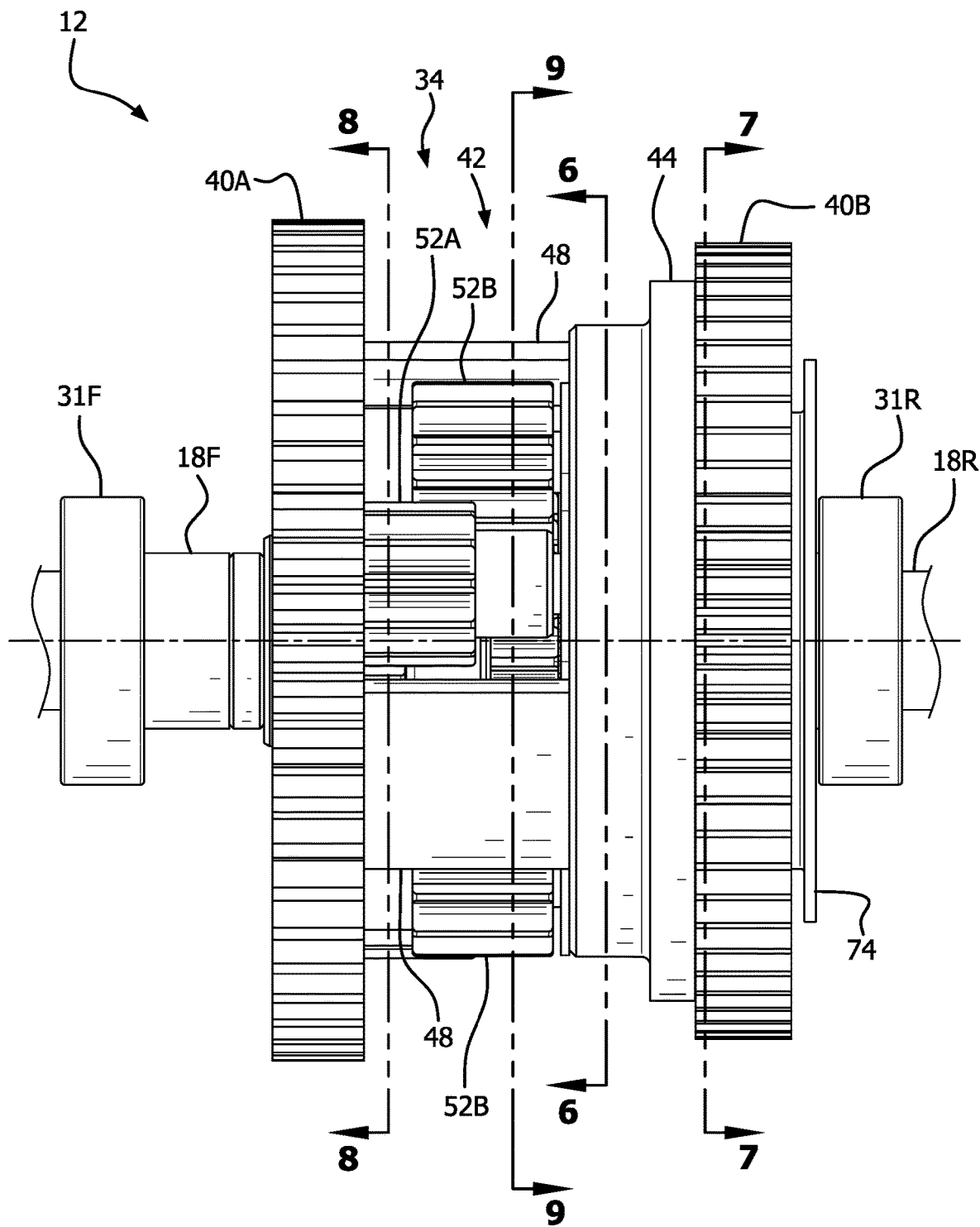
FIG. 5 is a partial side view of the internal components of the center differential of FIG. 2.
Figure 7:
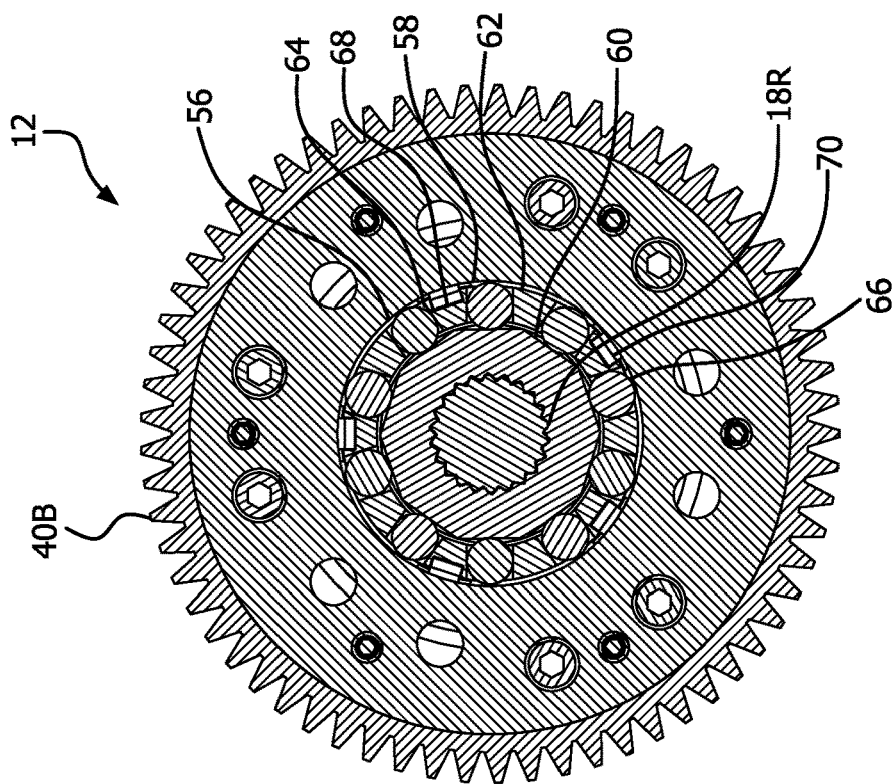
FIG. 7 is a cross-sectional view of the internal components of the center differential along line 7-7 of FIG. 5.
Figure 6:
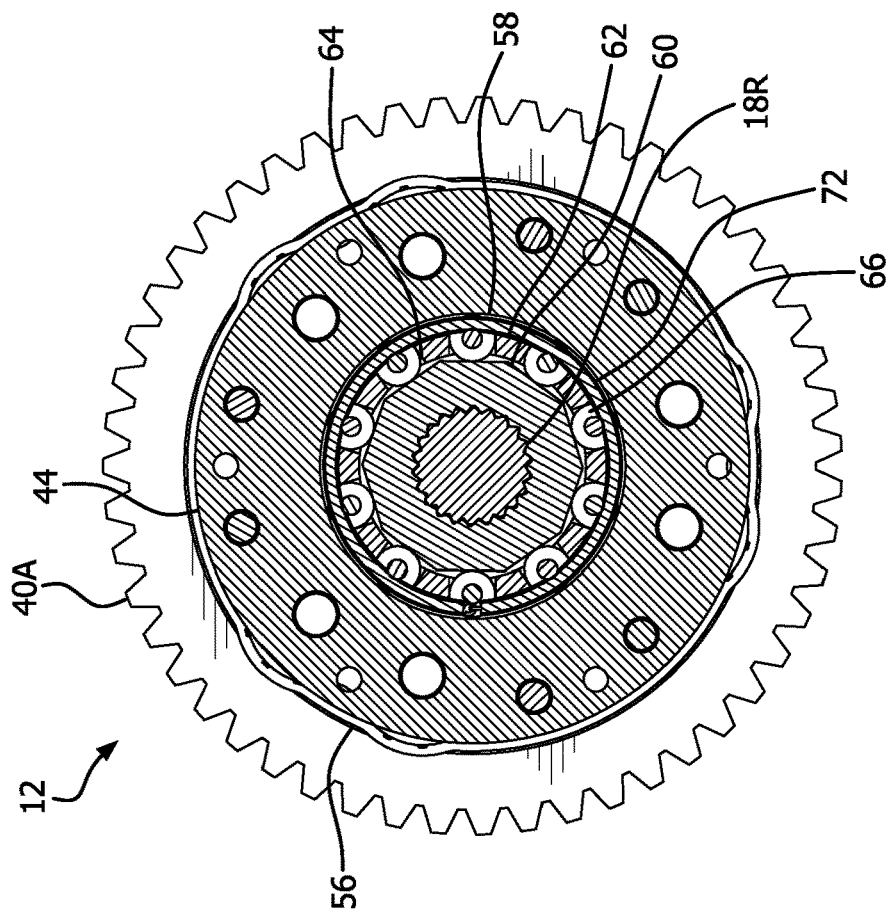
FIG. 6 is a cross-sectional view of the internal components of the center differential along line 6-6 of FIG. 5.

Referring to the drawings, wherein like reference numerals illustrate corresponding or similar elements throughout the several views, FIG. 1 is a schematic representation of an embodiment of a drive system 10 incorporating a center differential 12 according to an embodiment of the present invention. The drive system 10 also includes an engine 14 (such as an internal combustion engine or an electric motor powertrain) that rotatably drives a transmission 16. The transmission 16 rotatably drives the center differential 12, which in turn rotatably drives a front drive shaft 18F and a rear drive shaft 18R. The front drive shaft 18F rotatably drives a front differential 20, which in turns rotatably drives first and second front driven shafts 22L, 22R and front wheels 24L, 24R. The rear drive shaft 18R rotatably drives a rear differential 26, which in turns rotatably drives first and second rear driven shafts 28L, 28R and rear wheels 30L, 30R. The center differential 12 and the front differential 20 are operatively coupled to an electronic controller or power supply 32 and one or more user manipulated controls (for example, on/off switches or buttons).

Center Differential

FIGS. 2-9 provide various views of the center differential 12 of the drive system 10 according to one embodiment. The center differential 12 includes an outer housing or differential housing (not shown) that is secured to a frame of a vehicle (not shown) incorporating the drive system 10 or to the transmission 16. The housing rotatably carries or supports the front drive shaft 18F and the rear drive shaft 18R via bearings 31F, 31R, which carry spacers 33F, 33R. Generally, the housing carries an open differential assembly 34, a bi-directional overrunning roller clutch 36, and an electromagnet assembly 38. The open differential assembly 34 is driven by an input drive (not shown) of the transmission 16, and the open differential assembly 34 in turn drives the front drive shaft 18F and the rear drive shaft 18R. As described in further detail below, when the electromagnet assembly 38 is not energized, the bi-directional overrunning roller clutch 36 is disengaged and the open differential assembly 34 is in an unlocked configuration. In the unlocked configuration, the open differential assembly 34 permits relative rotation or differentiation between the front drive shaft 18F and the rear drive shaft 18R (for example, to facilitate turning the vehicle). In contrast, when the electromagnet assembly 38 is energized, the bi-directional overrunning roller clutch 36 is engaged and the open differential assembly 34 is in a locked configuration. In the locked configuration, the open differential assembly 34 inhibits relative rotation between the front drive shaft 18F and the rear drive shaft 18R (for example, to facilitate moving the vehicle in low-traction situations).

With continued reference to FIGS. 2-9, in the illustrated embodiment the open differential assembly 34 includes two input gears, more specifically a first ring gear 40A and a second ring gear 40B. The ring gears 40A, 40B are preferably made from steel material. The first ring gear 40A is driven in a first rotational direction when the vehicle is driven in a forward direction and the second ring gear 40B is driven in a second rotational direction (opposite from the first rotational direction) when the vehicle is driven in the reverse direction. Alternatively, the open differential assembly 34 could include a single input gear for driving the vehicle in both the forward and reverse directions. In the illustrated embodiment, the first ring gear 40A and the second ring gear 40B drive a planetary gear assembly 42. More specifically, the first ring gear 40A and the second ring gear 40B are fixed to a planetary carrier 44 via a plurality of posts 46, spacers 48, and fasteners 50. The posts 46 also rotatably carry a plurality of first planetary gears 52A and a plurality of secondary planetary gears 52B. The planetary gears 52A and 52B are preferably made from steel material. Each first planetary gear 52A is paired and meshably engages one of the secondary planetary gears 52B. The first planetary gears 52A are also disposed radially outwardly relative to and meshably engage a first sun gear 54A. Similarly, the second planetary gears 52B are disposed radially outwardly relative to and meshably engage a second sun gear 54B. The sun gears 54A and 54B are preferably made from steel material. The first sun gear 54A and the second sun gear 54B engage the front drive shaft 18F and the rear drive shaft 18R, respectively, via any conventional means designed to transfer torque from a gear to a shaft. In the illustrated embodiment, the sun gears 54A and 54B includes internal splines which mate with external splines on the drive shafts 18F and 18R. The above gearing arrangement permits the sun gears 54A and 54B and the drive shafts 18F and 18R to rotate at different speeds relative to each other and relative to the planetary carrier 44. The above gearing arrangement also permits the first sun gear 54A and the front drive shaft 18F to rotate in the opposite direction from the second sun gear 54B and the rear drive shaft 18R. In other embodiments, the open differential assembly 34 may take other forms. For example, the open differential assembly 34 could include a bevel gear assembly instead of a planetary gear assembly.

With specific reference to FIGS. 2, 4, 6, and 7, in the illustrated embodiment the bi-directional overrunning roller clutch 36 is partially defined by and disposed within the planetary carrier 44. More specifically, a portion of the planetary carrier 44 (e.g. the rear side of the planetary carrier 44) provides a clutch housing or recess 56 which has a smooth inner diameter surface 58. The clutch housing 56 is concentrically disposed around a hub 60 including a plurality of cam surfaces 60S, also referred to as a cammed hub, and the cammed hub 60 engages the rear drive shaft 18R via any conventional torque transfer means. In the illustrated embodiment, the cammed hub 60 includes internal splines which mate with the external splines on the rear drive shaft 18R. As a result, the cammed hub 60 also rotates in combination with the second sun gear 54B. The radial space between the cammed hub 60 and the clutch housing 56 is occupied by a roll cage 62. The roll cage 62 can be made from any suitable material that is sufficiently strong to withstand the applied loads, such as hardened anodized aluminum material, engineered polymer, or steel. The roll cage 62 has a plurality of equally-spaced slots 64 about its circumference. Each slot 64 holds a roller 66, and each roller 66 is preferably made from hardened steel material. One end of the roll cage 62 has a plurality of slots or notches 68 that are engaged by an armature plate 70. The armature plate 70 can be engaged to the roll cage 62 in other manners. For example, while the armature plate 70 has been described as a separate component from the roll cage 62, it is also contemplated that the armature plate 70 can be attached to, formed on, or engaged with the roll cage 62 so as to rotate in combination with the roll cage 62. Alternately, the armature plate 70 can be permanently or removably attached to the roll cage 62, or may simply be a surface on the roll cage 62. The rollers 66 are biased radially inwardly toward the cammed hub 60 by one or more springs 72, such as garter springs, which extend around the roll cage 62 and all of the rollers 66. As described in further detail below, when the bi-directional overrunning roller clutch 36 is disengaged, the springs 72 bias the rollers 66 away from the clutch housing 56. As a result, the clutch housing 56 and the cammed hub 60 are permitted to rotate at different speeds, which in turn permits the rear drive shaft 18R and the front drive shaft 18F to rotate at different speeds via the open differential assembly 34. In contrast, when the bi-directional overrunning roller clutch 36 is engaged, the rollers 66 wedge between the cammed hub 60 and the clutch housing 56. As a result, the clutch housing 56 rotates in combination with the cammed hub 60, which causes the rear drive shaft 18R and the front drive shaft 18F to rotate in combination with each other. In other embodiments, the bi-directional overrunning roller clutch 36 may take other forms. For example, the hub 60 could have a uniform outer diameter and the clutch housing 56 could include cam surfaces for engaging the rollers 66.

With specific reference now to FIGS. 2 and 4, the electromagnet assembly 38 is preferably bonded or otherwise attached to the housing and is located adjacent or in close proximity to the armature plate 70 and the bi-directional overrunning roller clutch 36. The electromagnet assembly 38 includes an electromagnet housing (or pocket) 74, preferably annular, that carries an electromagnet or coil 76, preferably annular. The coil 76 is configured to receive electrical power from the controller 32 (FIG. 1; for example, upon actuation of one of the user manipulated controls) via an electrical harness 78. When the electromagnet assembly 38 is energized (that is, when the coil 76 receives electrical power), the coil 76 attracts the armature plate 70, which causes the armature plate 70 to resist rotation. This in turn causes the roll cage 62 to resist rotation and drag or index the rollers 66 to a position relative to the cam surface 60S of the cammed hub 60 that will wedge the rollers 66 between the cam surface 60S and the inner surface 58 of the clutch housing 56. Once the rollers 66 are wedged, the cammed hub 60 and clutch housing 56 rotate in combination with each other and the open differential assembly 34 occupies the locked configuration as described above.

Front Differential

Referring now to FIGS. 10-14, the front differential 20 of the drive system 10 of one embodiment is shown. The front differential 20 may have the same or similar components and features as any of the front differentials described in U.S.

Pat. No. 8,840,514 or 8,857,294, the disclosures of which are incorporated herein by reference in their entireties. More specifically and referring first to FIGS. 10 and 11, the front differential 20 includes a differential housing including a cover 80 removably mounted to a differential gear case 82. As shown, a pinion input gear 84 is rotatably disposed within the case 82. A shaft 86 of the pinion input gear extends out from an opening in the case 82 and is adapted to attach to the front drive shaft 18F (FIG. 1). For example, the front drive shaft 18F engages with a splined end of a pinion input shaft 86. In order to facilitate rotation of the pinion input shaft 86, a bearing 88 is preferably mounted between the shaft 86 and the case 82. An oil seal 87 is preferably located between the case 82 and the pinion input shaft 86. The oil seal 87 prevents oil from escaping out of the case 82.

The pinion input gear 84 preferably has a bevel gear 90 formed on or attached to the end of the shaft 86 within the differential case 82. The bevel gear 90 is preferably made from steel material. The bevel gear 90 engages with a ring gear 92 located within the differential case 82. The ring gear 92 is preferably made from steel with mating bevels. It is contemplated that other gearing arrangements, such as a worm gear set or helical gearset, may be used for engaging the pinion input shaft 86 to the ring gear 92.

The ring gear 92 is preferably formed integral with or attached to a clutch housing 94. The clutch housing 94 includes an internal diameter with a contour or cam surface 96. A bushing 98 is mounted between the clutch housing 94 and the differential case 82 for permitting the clutch housing 94 to freely rotate within the differential case 82. The bushing 98 is preferably a self-lubricating bushing, such as a DU bushing. A roll cage assembly 100 is located within the clutch housing 94 and includes a roll cage 102 with a plurality of rollers 104 rotatably disposed within slots 106 in the cage 102. More specifically, the roll cage 102 preferably includes two independent sets of rollers 104 disposed within two sets of slots 106 formed in the roll cage 102 around its circumference. The roll cage 102 can be made from any suitable material that is sufficiently strong to withstand the applied loads, such as hardened anodized aluminum material or steel. Alternatively, the roll cage 102 can be made from plastic or composite material. The rollers 104 are preferably made from hardened steel material. The roll cage assembly 100 includes a plurality of spring elements or clips (not shown) for positioning the rollers 104 in the slots 106. A variety of springs may be used. In some embodiments, each spring clip is preferably substantially H-shaped with two independent springs that are attached to or formed on opposite sides of a bridge. The bridge separates each spring into two opposed arms. The arms are preferably curved or arcuate in shape such that the combination of the arms is concave, similar to the shape of a leaf spring. However, the arms may also be linear such that they combine with the bridge to form a Y shape. The bridge acts as a yoke to support the arms permitting them to bend independently from one another, as well as from the opposite spring. Each slot 106 includes a spring from two adjacent spring clips, thus biasing the roller substantially into the center of the slot. The springs account for tolerances in the manufacturing of the various components so that the rollers all engage at the same time. Other spring mechanisms can be used in the present invention. U.S. Pat. Nos. 6,629,590, 6,622,837 and 6,722,484, which are incorporated herein by reference in their entirety, disclose suitable spring arrangements and roll cage assemblies.

Each set of rollers 104 is located adjacent to the inner cam surface 96 of the clutch housing 94. In one configuration, of the contour of the cam surface 96 includes a plurality of peaks and valleys. When the roll cage 102 is located within the clutch housing 94 and the clutch is not activated, the rollers 104 are located within the valleys with the cam surface 96 tapering toward the cage on either side of the roller 104. The cam surface 96 and rollers 104 provide the front differential 20 capabilities as described in detail in U.S. Pat. Nos. 6,629,590, 6,622,837 and 6,722,484. Cam surfaces and roll cages in overrunning clutches are well known in the art. Hence, a detailed discussion of these features is not needed.

Figure 10:
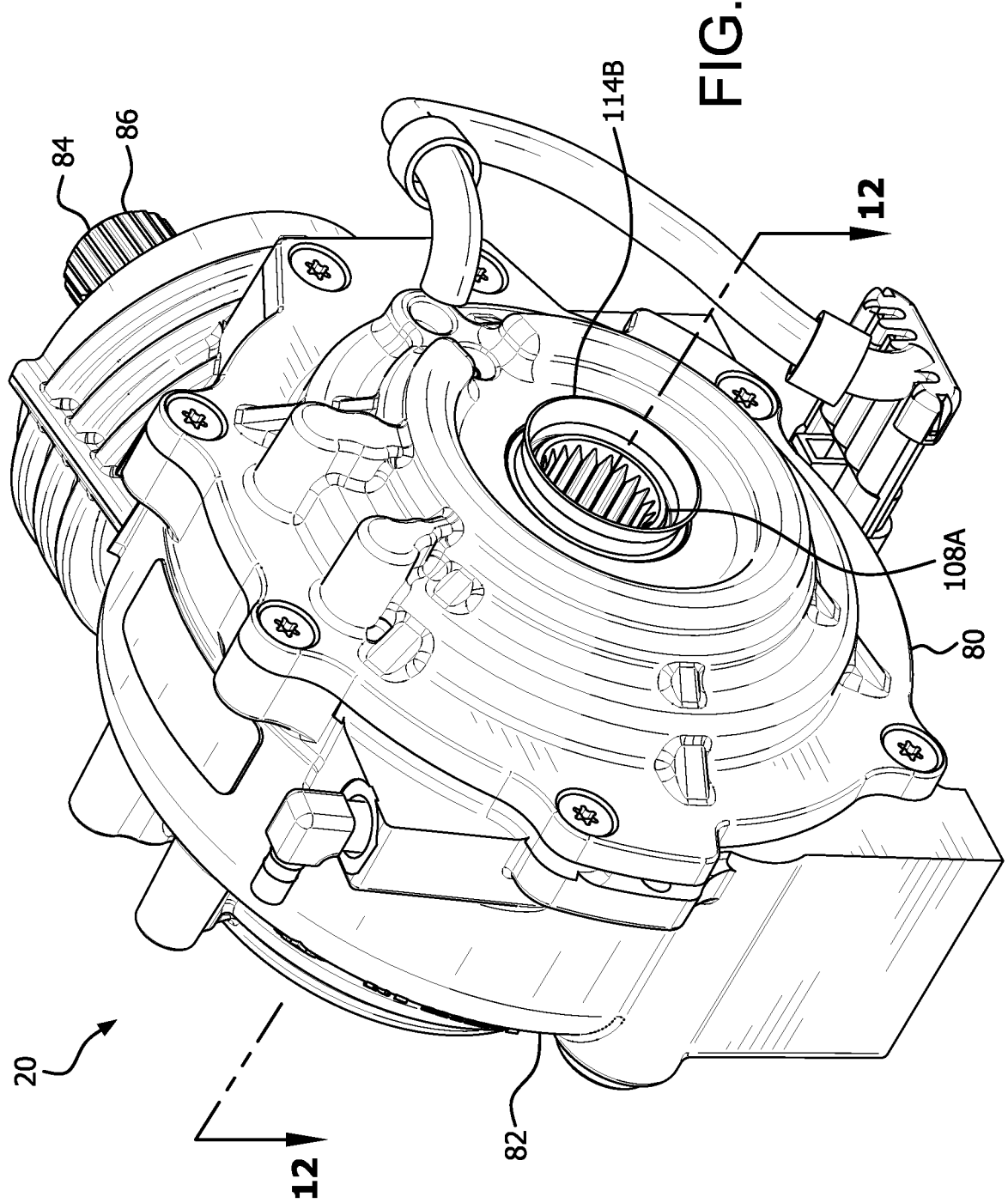
FIG. 10 is a perspective view of an embodiment of a front differential of the drive system of FIG. 1.
Figure 11:
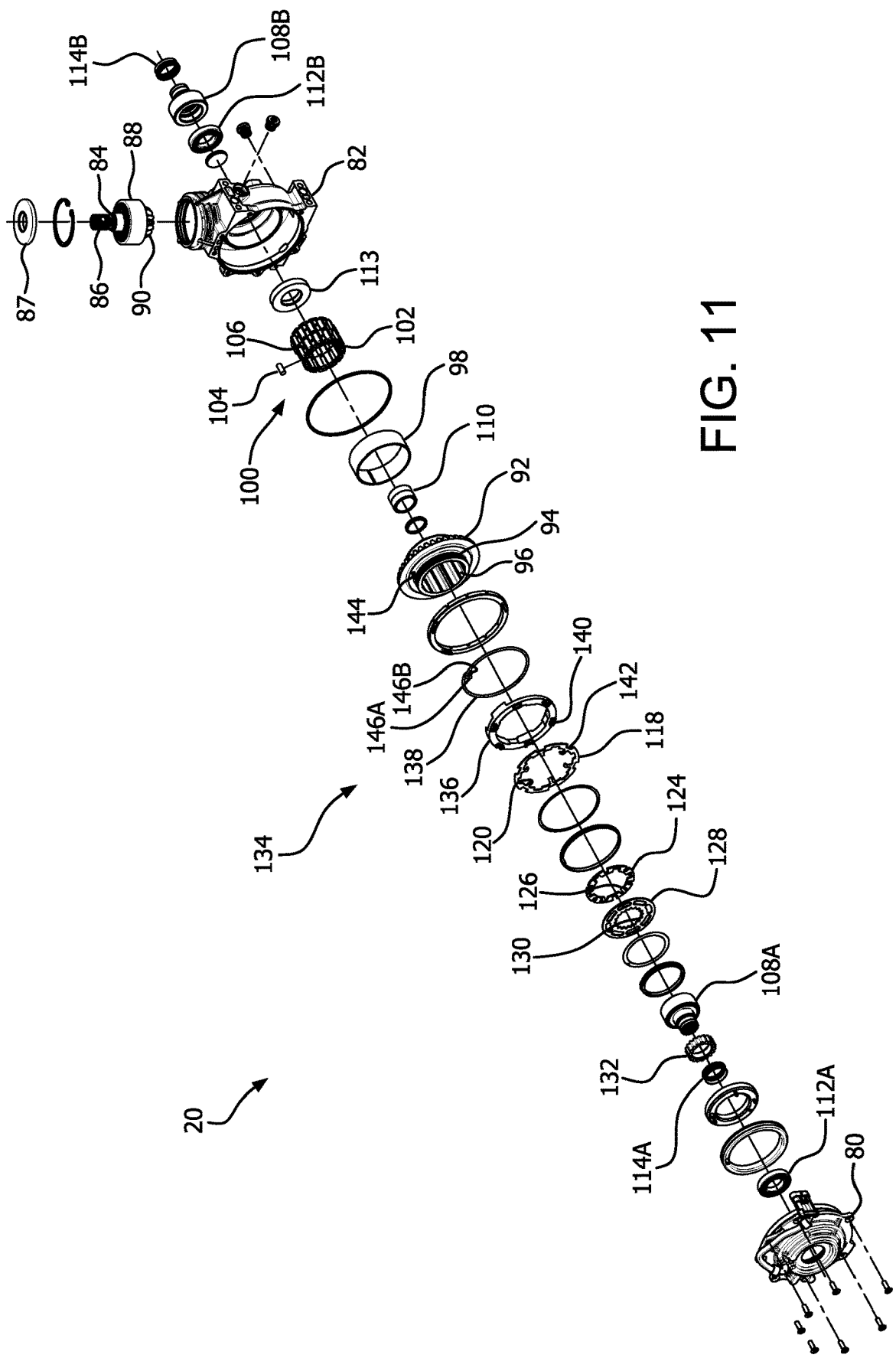
FIG. 11 is an exploded perspective view of the front differential of FIG. 10.

With continued reference to FIGS. 10 and 11, there are two hubs 108A, 108B, which include a portion located radially inward of the roll cage 102. Each hub 108A, 108B is adjacent to one of the sets of rollers 104 such that the outer surface of a portion of each hub contacts a set of rollers 104. As is well understood in the art, the contact between the rollers 104, the clutch housing 94 and the hubs 108A, 108B transfer rotation between the clutch housing and the axles. A bushing 110 is preferably located between the inner ends of the two hubs 108A, 108B.

The hubs 108A, 108B engage with the first and second front driven shafts 22L, 22R (FIG. 1), respectively, via any conventional means designed to transfer torque from the hub to the shaft. In the illustrated embodiment, each hub 108A, 108B includes internal splines which mate with external splines on a portion of the front driven shafts 22L, 22R. It is contemplated that the hubs 108A, 108B and the front driven shafts 22L, 22R could be formed as integral units if desired. The internal splines on the hubs 108A, 108B are accessible through openings formed in the cover 80 and gear case 82. Roller bearings 112A, 112B are mounted between a portion of each hub 108A, 108B and the corresponding cover 80 or case 82. The roller bearings 112A, 112B support the hubs 108A, 108B while permitting the hubs 108A, 108B to rotate with respect to the cover 80 and case 82, respectively. A spacer 113 is positioned adjacent the hub 108B, and the spacer 113 positions the roll cage 102. Oil seals 114A, 114B are preferably incorporated into the cover 80 and case 82 around the hubs 108A, 108B, respectively, to provide fluid tight seals.

As discussed briefly above, the engagement of the rollers 104 with the clutch housing 94 and hubs 108A, 108B permits the transfer of torque from the front drive shaft 18F to the front driven shafts 22L, 22R. In order to activate the overrunning clutch and thereby make the vehicle capable of engaging in four-wheel drive and engine braking, the front differential 20 preferably incorporates an electromagnet assembly. More specifically, the front differential 20 includes two or more roll cage adjustment devices or indexing devices which are electrically connected to an electronic control system. Each adjustment device preferably includes an electromagnetic coil assembly. The first indexing device (e.g., the electronic or electromagnetic drive activation device or electromagnetic drive coil assembly) is configured, when activated, to cause the roll cage to index into an active drive state (i.e., four-wheel drive capability) where the rolls are positioned to cause the front drive shaft 18F be coupled to the front driven shafts 22L, 22R when four-wheel drive capability is needed.

The second indexing device (e.g., the electromagnetic backdrive activation device or electromagnetic backdrive coil assembly) is configured, when activated, to cause the roll cage to index into an active backdrive state (i.e., engine breaking capability) where the rolls are positioned to cause the front driven shafts 22L, 22R to be coupled to the front drive shaft 18F for providing torque transfer from the front driven shafts 22L, 22R to the front drive shaft 18F during an engine braking condition. The second indexing device may be activated when the vehicle is decelerating or on a downhill.

Figure 12:
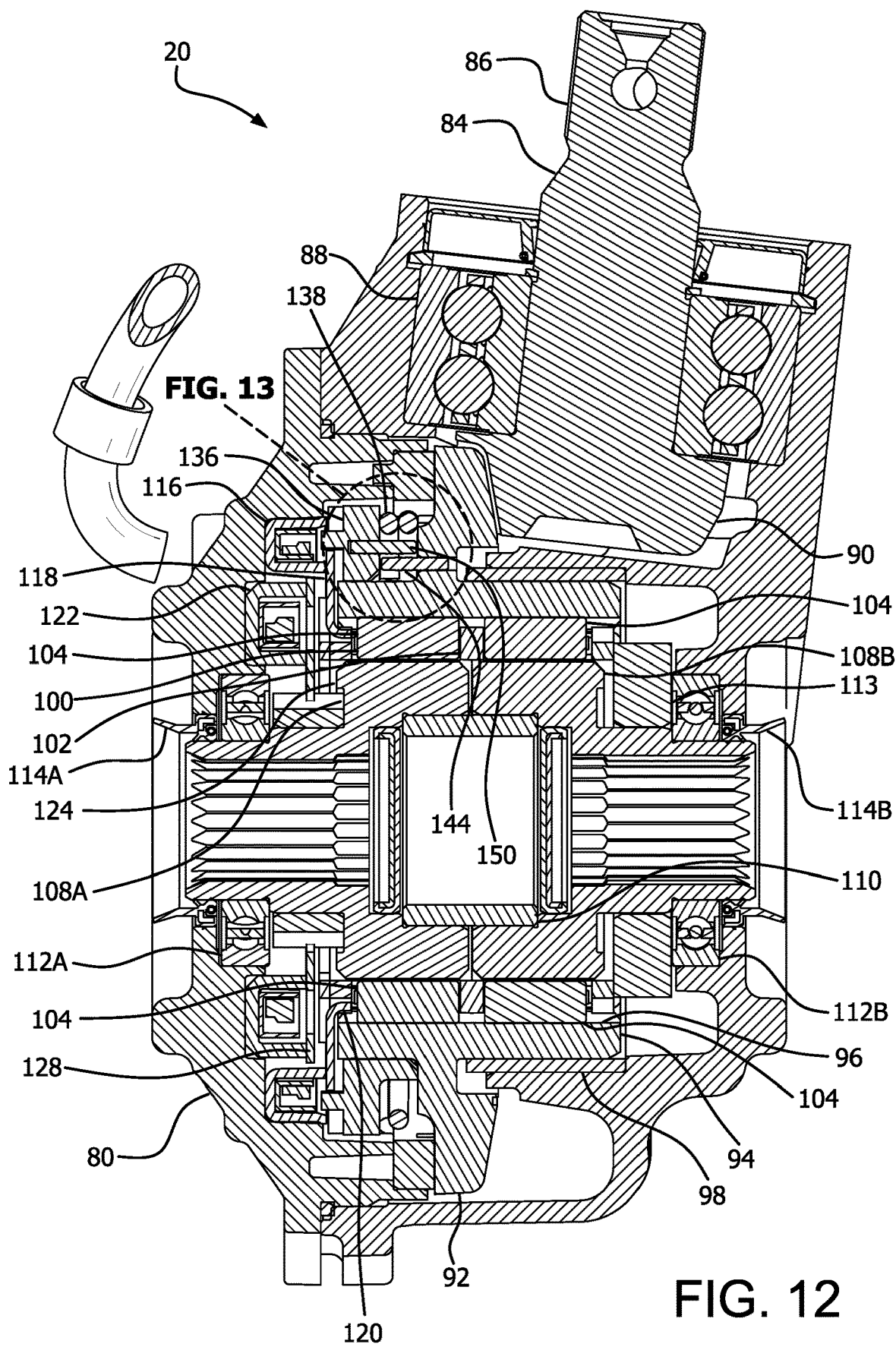
FIG. 12 is a top sectional view of the front differential along line 12-12 of FIG. 10.

With continued reference to FIGS. 10 and 11 and additional reference to FIG. 12, in the illustrated embodiment, each electromagnetic indexing device includes a coil assembly that includes a coil in an annular steel coil pocket or housing and an armature plate which control retarding or indexing of the roll cage 102 with respect to the clutch housing 94. The first indexing device includes a drive coil assembly 116 that is preferably attached to the cover 80 at a location radially outward from the hub 108A. The drive coil assembly 116 is preferably annular in shape with a central axis coincident with the axis of rotation of the roll cage 102. The drive coil assembly 116 is preferably a bobbin wound coil which includes a plastic base about which the coil is wound. Suitable coils for use in the present invention are well known to those skilled in the electric clutch art. The drive coil assembly 116 is preferably bonded or otherwise attached to the cover 80.

A first armature plate 118 is located between the drive coil assembly 116 and the roll cage 102. The armature plate 118 is preferably annular in shape and is free to rotate with respect to the drive coil assembly 116 when the coil is not energized. The armature plate 118 includes at least one and, more preferably a plurality of tangs or fingers 120 which protrude from the armature plate 118 toward the roll cage 102. The tangs 120 engage with slots or notches formed in or on an end face of the roll cage 102. The armature plate 118 is engaged with the roll cage 102 when the tangs 120 are engaged with the slots. Hence, when the drive coil assembly 116 is not energized, the armature plate 118 rotates with the roll cage 102 relative to the clutch housing 94. The armature plate 118 is preferably made from steel material. While a separate armature plate 118 has been described, it is also contemplated that armature plate can be attached to, formed on, or engaged with the roll cage 102 so as to rotate in combination with the roll cage 102. Alternately, the armature plate 118 can be permanently or removably attached to the roll cage 102, or may simply be a surface on the roll cage 102.

When the drive coil assembly 116 is energized, an electromagnetic field is generated between the drive coil assembly 116 and the armature plate 118 attracting the armature plate 118 to the drive coil assembly 116, thus causing it to drag. Because the armature plate 118 is engaged with the roll cage 102 by the tangs 120, the dragging of the armature plate 118 causes the roll cage 102 to also drag or retard. In an alternate embodiment (not shown), instead of tangs 120 on the armature plate 118 engaging with slots, the roll cage 102 includes protrusions that engage with slots in the armature plate 118. The drive coil assembly 116 is connected to the controller 32 (FIG. 1) for controlling energizing of the coils (for example, upon actuation of one of the user manipulated controls).

The second indexing device includes a backdrive coil assembly 122 that is preferably attached to the cover 80 at a location radially outward from the hub 108A but inward from the drive coil assembly 116. The backdrive coil assembly 122 is preferably similar to the drive coil assembly 116 and is annular in shape with a central axis coincident with the axis of rotation of the roll cage 102. The backdrive coil assembly 122 is preferably bonded or otherwise attached to the cover 80.

A second armature plate 124 is located between the backdrive coil assembly 122 and the roll cage 102. The second armature plate 124 is preferably annular in shape and is free to rotate with respect to the backdrive coil assembly 122 when the coil is not energized. The second armature plate 124 includes at least one and, more preferably a plurality of tangs or fingers 126 which protrude from the second armature plate 124 toward the roll cage 102. The tangs 126 engage with slots formed in or on an end of the roll cage 102. The second armature plate 124 is engaged with the roll cage 102 when the tangs 126 are engaged with the slots. Hence, when the backdrive coil assembly 122 is not energized, the second armature plate 124 rotates with the roll cage 102 relative to the clutch housing 94. The second armature plate 124 is preferably made from steel material. As with the first armature plate 118, the second armature plate 124 can be engaged to the roll cage 102 in other manners. For example, while the second armature plate 124 has been described above as a separate component from the roll cage 102, it is also contemplated that the second armature plate 124 can be attached to, formed on, or engaged with the roll cage 102 so as to rotate in combination with the roll cage 102. Alternately, the second armature plate 124 can be permanently or removably attached to the roll cage 102, or may simply be a surface on the roll cage 102. It is also contemplated that a single armature plate can be used in the front differential 20 with two independently controlled coil assemblies mounted in a common cover or housing. It is also contemplated that two armature plates could be interlocking with drive feature(s) but only one of the armature plates is interacting with the roll cage 102.

A hub plate 128 is positioned between the backdrive coil assembly 122 and the second armature plate 124. The hub plate 128 is engaged with the hub 108A. Specifically, the hub plate 128 is annular in shape and includes, in one preferred embodiment, teeth 130 around an inner diameter that engage with splines 132 formed on an outer surface of the hub 108A. Thus, the hub plate 128 is configured to rotate in combination with the hub 108A. Other mechanisms can be used to engage the hub plate 128 to the hub 108A. An upper portion of the hub plate 128 is located adjacent to the backdrive coil assembly 122 and the second armature plate 124.

When the backdrive coil assembly 122 is energized, an electromagnetic field is generated between the backdrive coil assembly 122, the hub plate 128 and the second armature plate 124 attracting the hub plate 128 and second armature plate 124 to the backdrive coil assembly 122. Since the hub plate 128 is coupled to the hub 108A, activation of the backdrive coil assembly 122 magnetically holds the second armature plate 124 to the hub 108A thus causing it to want to rotate with the hub 108A. Since the second armature plate 124 is engaged with the roll cage 102 by the tangs 126, the magnetic engagement of second armature plate 124 causes the roll cage 102 to advance relative to the clutch housing 94 as the hub 108A rotates. The backdrive coil assembly 122 is also connected to the electronic controller 32 for controlling energizing of the coils (for example, upon actuation of one of the user manipulated controls).

While the first and second indexing systems are described above as including coil assemblies, it is also contemplated that other electronically controlled assemblies can be used. For example, an electrically controlled solenoid could be used to cause the indexing. In this embodiment, the solenoid would be activated by the electronic control system so as to cause a plunger to engage the armature plate, hub plate, and/or a surface on the roll cage to produce the necessary frictional contact for dragging the roll cage into its indexed position. Other systems, such as hydraulic and pneumatic actuators can be used in place of the coils and similarly controlled by the electronic control system. A person skilled in the art, in light of the teachings provided in this description, would be readily capable of implementing such systems into the clutch system shown.

Figure 14:
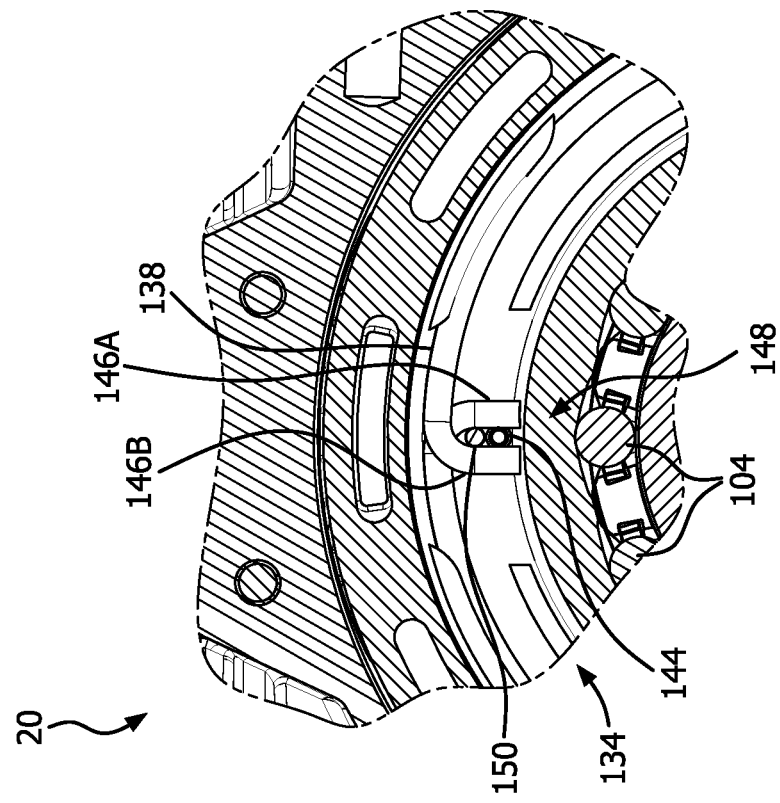
FIG. 14 is an enlarged cross-sectional view of the front differential along line 14-14 of FIG. 13.
Figure 13:
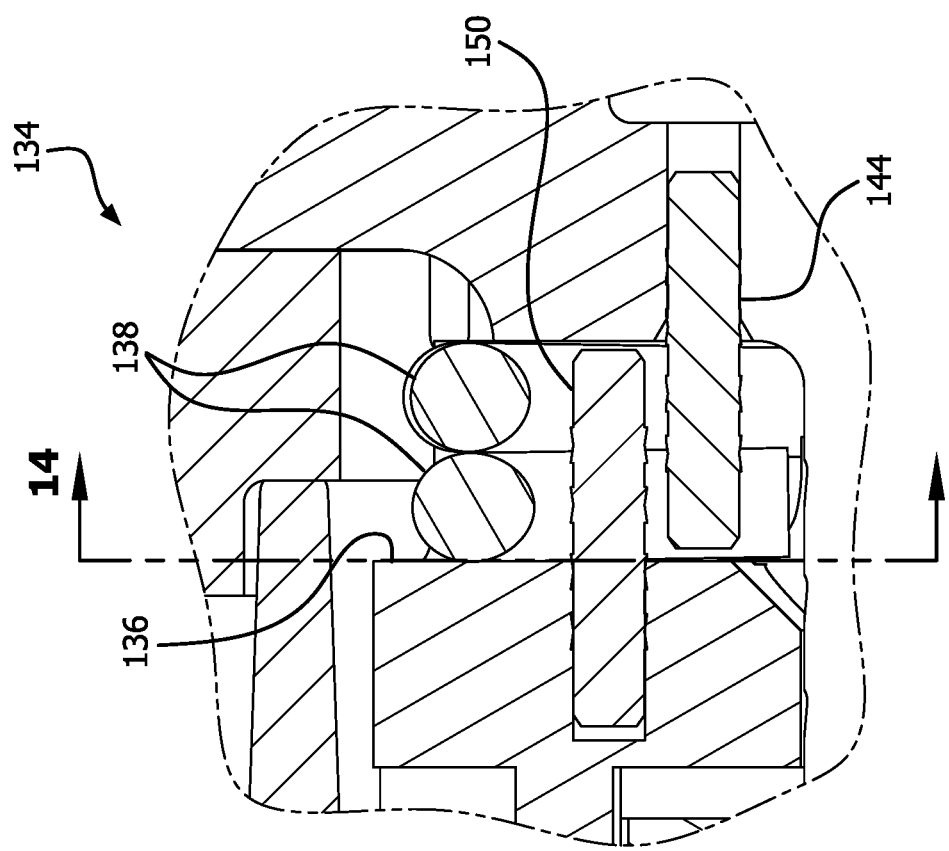
FIG. 13 is an enlarged detail view of a portion of the front differential as identified in FIG. 12.
Figure 15:
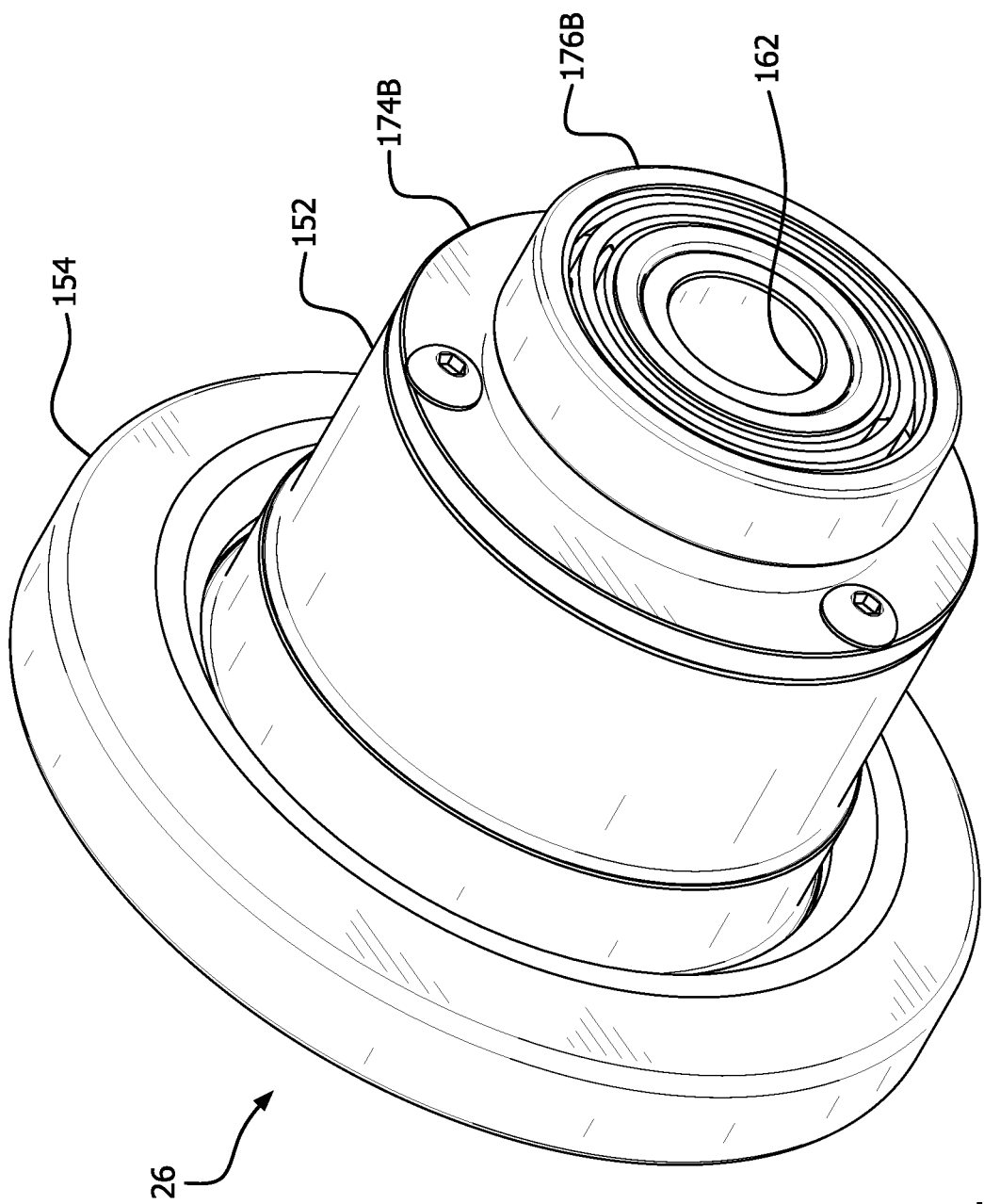
FIG. 15 is a perspective view of an embodiment of a rear differential of the drive system of FIG. 1.
Figure 16:
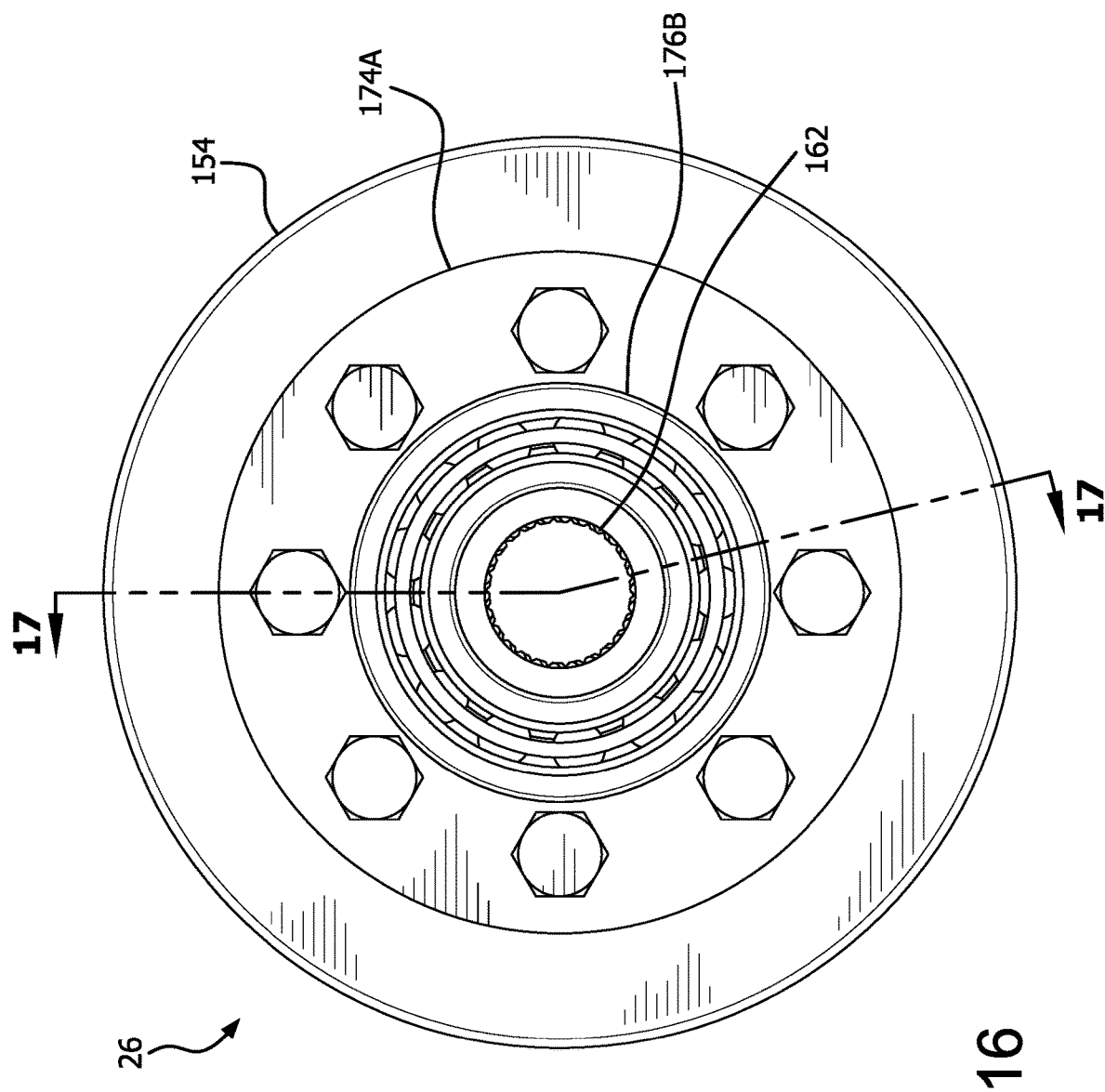
FIG. 16 is an end view of the rear differential of FIG. 15.

The indexing systems above are configured to move the roll cage 102 in a prescribed direction relative to the clutch housing when a certain state of operation is desired (four-wheel drive or engine braking). When those states are no longer desired, the system includes a spring assembly for biasing the roll cage 102 back to its neutral position. Referring now to FIGS. 12-14, the spring assembly may be a torsion spring assembly 134. The torsion spring assembly 134 includes a spring retainer adapter 136 which, as will be discussed below, provides a connection between a torsion spring 138 and the first armature plate 118. However, as will become apparent, the adapter 136 could alternately be connected to the second armature plate 124. The adapter 136 is an annular ring that is disposed about an outer surface of the clutch housing 94. One side of the adapter 136 is located adjacent to a portion of the first armature plate 118. In one embodiment the adapter 136 has at least one and more preferably a plurality of protruding lugs or tabs 140 that extend out of the side of the adapter 136 facing the first armature plate 118. The lugs 140 mate with notches 142 formed in the first armature plate 118. The mating of the adapter 136 with the armature plate 118 provides a connection between the adapter 136 and the roll cage 102 (which is engaged with the armature plate through the tabs 120). The adapter 136 includes an adapter pin 144 (FIG. 14) that protrudes out of the side of the adapter 136 opposite from the armature plate 118.

The torsion spring 138 is generally circular in shape with its ends overlapping. The spring 138 is also disposed about the outer surface of the clutch housing 94 and adjacent to the adapter 136. The torsion spring 138 is designed to bias the roll cage 102 to its neutral position (with the rolls centered in the cam surface 96). The overlapping ends of the torsion spring 138 include arms 146A, 146B that extend at a generally right angles to where they extend from the spring 138. The ends of the torsion spring overlap such that the arms 146A, 146B on the torsion spring 138 extend past one another defining a gap 148. A clutch pin 150 extends outward from the clutch housing 94 and is captured in the gap 148 with the arms 146A, 146B on either side of the clutch pin 150. The arms 146A, 146B are also on either side of the adapter pin 144 which is located adjacent to the clutch pin 150. Thus, the adapter 136 acts to retain the torsion spring 138 on the clutch housing 94.

When the first indexing device is energized it hinders the rotation of the armature plate 118, thus hindering the roll cage 102 and adapter 136. This causes the adapter pin 144 to move one of the spring arms 146A away from the other spring arm 146B (which is held stationary by the clutch pin 150). This movement causes the torsion spring 138 to deflect at which point the spring force of the torsion spring 138 acts against the adapter pin 144 to bias it back toward the clutch pin 150 and the neutral position of the roll cage 102.

The incorporation of a torsion spring 138 provides much tighter tolerance and provides a reliable mechanism for returning the roll cage 102 to its neutral position, preventing unwanted wedging of the rolls between the cam surface 96 and the hub. The torsion spring 138 also prevents premature engagement that could potentially occur in some designs. Also, the use of a torsion spring 138 reduces the need for the roll springs to be designed to bias the roll cage 102 into a neutral position. Thus, the operational life of the roll springs is increased. Other types of spring assemblies can be used in the front differential 20. For example, one or more springs could be mounted between the roll cage 102 and the clutch housing 94 (one end of the spring on the housing 94 the other on the roll cage 102) for biasing the roll cage 102 into its neutral position from an indexed position. Two springs can be used, each biasing the roll cage 102 in the opposition position. In this embodiment a spring adapter is not needed. If a spring adapter is used, the springs could be mounted between the adapter 136 and the roll cage 102.

Rear Differential

Referring now to FIGS. 15-18, the rear differential 26 of the drive system 10 of one embodiment is shown. The rear differential 26 may have the same or similar components and features as any of the rear differentials described in U.S. Pat. No. 8,919,513 or 9,022,195, the disclosures of which are incorporated herein by reference in their entireties. More specifically and referring first to FIGS. 15 and 16, the rear differential 26 includes a housing 152 and a flange 154 affixed to the housing 152. The flange 154 is adapted to receive or engage with an input gear or sprocket that is engaged with the rear drive shaft 18R (FIG. 1) for imparting rotational movement to the flange 154 and thus to the housing 152. The input gear may be attached to the flange 154 by any mechanical means known in the art, or may be formed as an integral part of the flange 154 or housing 152. When the rear drive shaft 18R is engaged with the input gear, the flange 154 rotates, which in turn rotates the housing 152. The rear differential 26 is mounted in an outer housing (not shown), and bearings 176A and 176B support the rear differential 26 in the outer housing.

Figure 17:
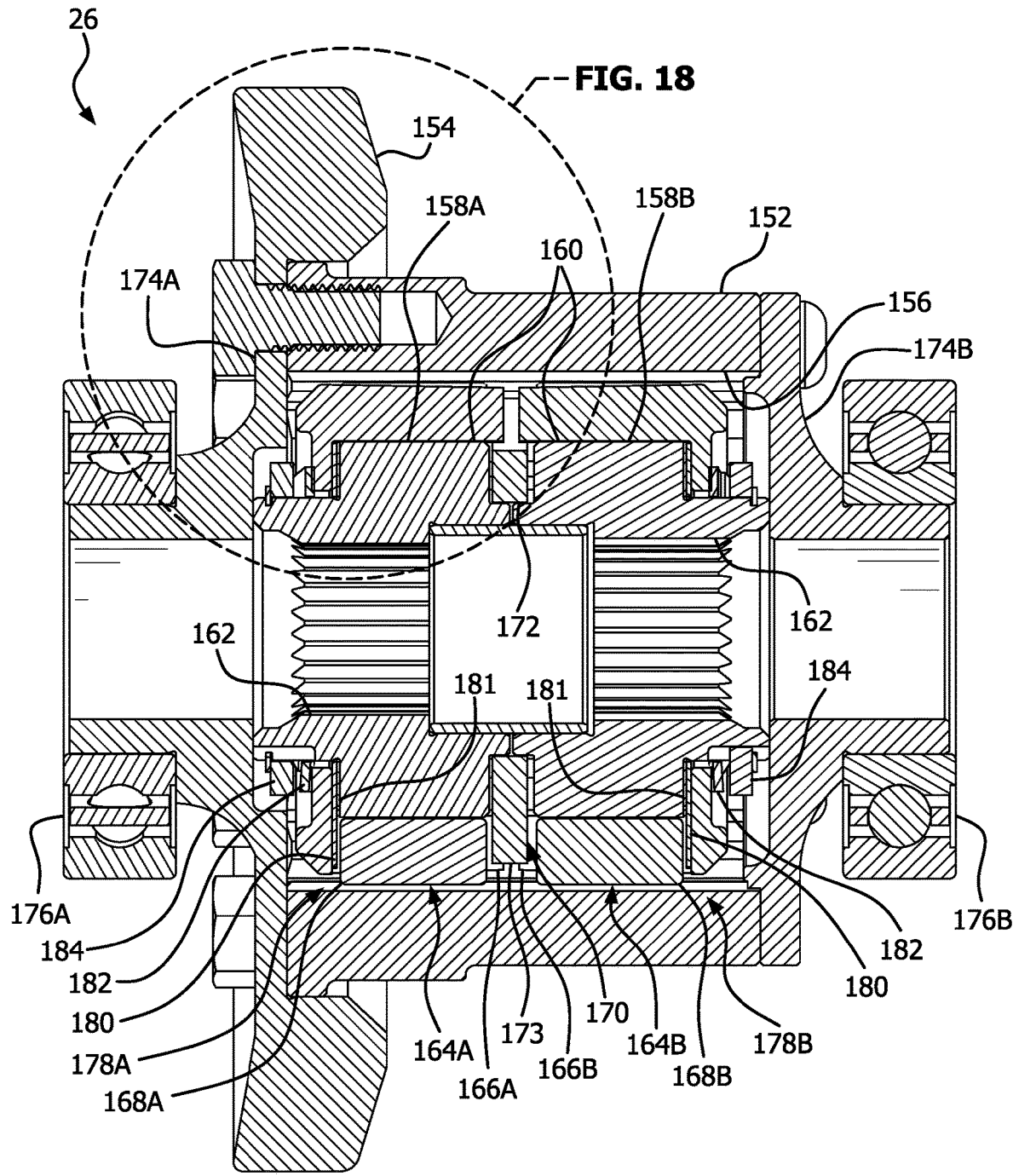
FIG. 17 is a side sectional view of the rear differential along line 17-17 of FIG. 16.
Figure 18:
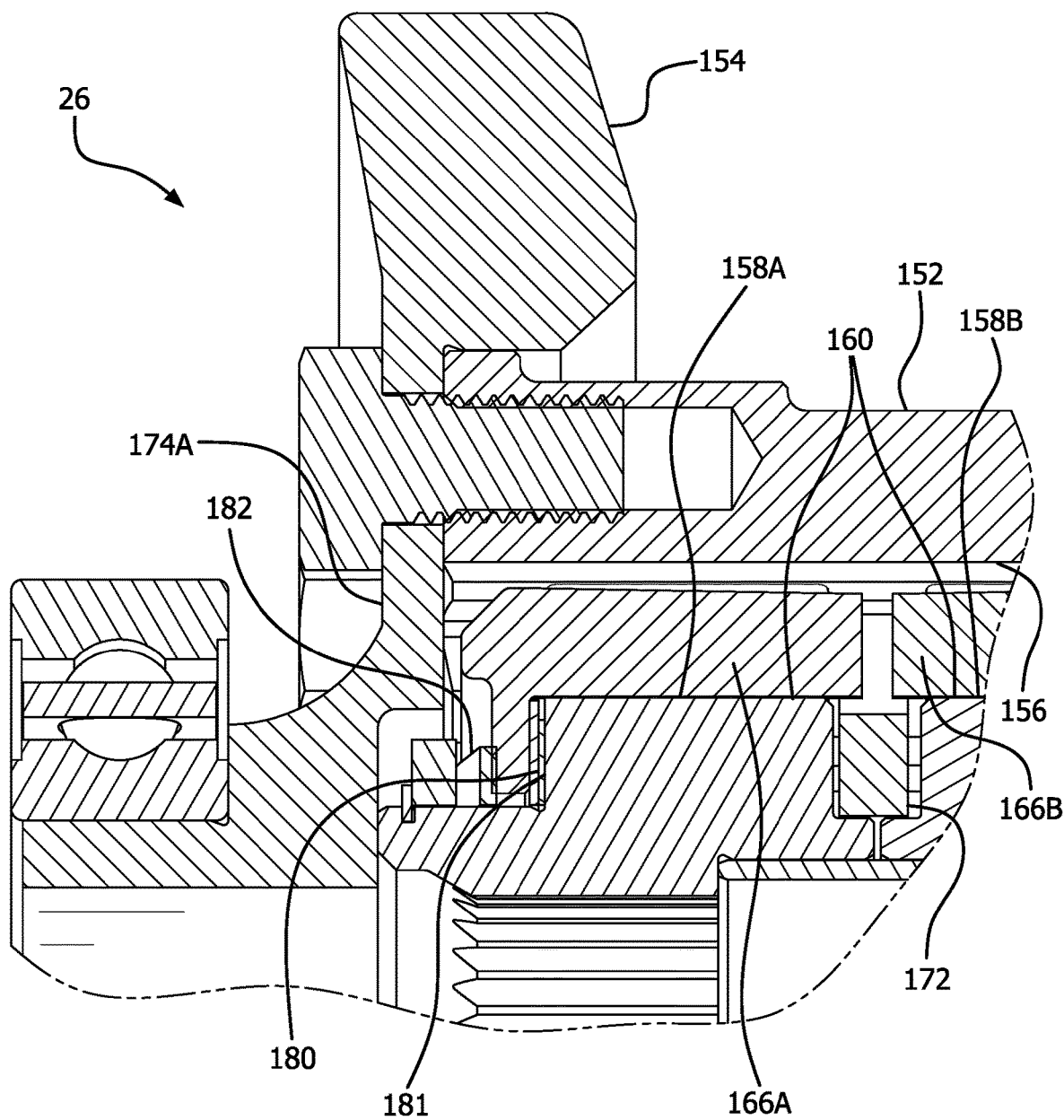
FIG. 18 is an enlarged detail view of a portion of the rear differential as identified in FIG. 17.

As shown in FIG. 17, the housing 152 includes a substantially cylindrical inner surface 156. The inner surface 156 includes a plurality of an inner cam surfaces (not shown) including forward and reverse cam surfaces. Depending on the desired direction of rotation of the housing 152, either cam surface may be interchangeably considered as a forward or a reverse cam surface.

With continued reference to FIG. 17, a pair of hubs 158A, 158B is located within the housing 152. The hubs 158A, 158B are substantially coaxially aligned with each other within the housing 152, and are each adapted to rotate about their common axis within the housing 152. The first hub 158A is adapted to engage an end of the first rear driven shaft 28L (FIG. 1) and the second hub 158B is adapted to engage an end of the second rear driven shaft 28R (FIG. 1). Each hub 158A, 158B has a substantially cylindrical outer surface 160 having a diameter smaller than the diameter of the inner surface 156 of the housing 152, so that an annular space is formed between the outer surface 160 of the hubs 158A, 158B and the inner surface 156 of the housing 152. Each hub 158A, 158B preferably has an internal bore 162 into which a portion of the corresponding driven shaft is received. In the depicted embodiment, the internal bores 162 include splines to allow the shafts to move axially inward and outward with respect to the hubs 158A, 158B while ensuring that each shaft will rotate in combination with its respective hub 158A, 158B. In other embodiments, other mechanical connections between each shaft and its respective hub 158A, 158B may be used to ensure rotational coupling. It is further contemplated that the hubs 158A, 158B may be formed integrally with the primary drive shafts.

A pair of roller assemblies 164A, 164B is located within the housing 152, with a portion of each roller assembly 164A, 164B being situated in the annular space between the outer surface 160 of one of the hubs 158A, 158B and the inner surface 156 of the housing 152. As shown in FIG. 17, the roller assemblies 164A, 164B include roll cages 166A, 166B, respectively, that are formed in substantially cylindrical shapes. The roll cages 166A, 166B correspond to the hubs 158A, 158B, respectively, and have sets of slots (not shown) spaced around their circumferences. The slots are adapted to receive cylindrical rollers 168A, 168B. The slots of the first roll cage 166A position a plurality of rollers 168A in the annular space between the first hub 158A and the inner cam surface 156 of the housing 152, and the slots of the second roll cage 166B position a plurality of rollers 168B in the annular space between the second hub 158B and the inner cam surface 156 of the housing 152. In one embodiment, each set of rollers 168A, 168B has ten rollers, it being understood that any number of rollers greater than or equal to three may be used. As shown, each roller 168A, 168B is substantially cylindrical, but rollers of other shapes may be used, including but not limited to substantially spherical rollers.

The rollers 168A, 168B are adapted to be wedgingly engaged between the hubs 158A, 158B, respectively, and the inner cam surface 156 of the housing 152 when the hubs 158A, 158B and the housing 152 are rotated with respect to the other. In particular, when the housing 152 is rotationally driven at a speed faster than the hubs 158A, 158B are rotating, the rollers 168 are designed to wedgingly engage between the forward cam surfaces in the housing and the outer surfaces 160 of the hubs 158A, 158B, causing the hubs 158A, 158B to rotate with the housing 152. Similarly, when both hubs 158A, 158B are rotating faster than the housing 152, such as during a descent or deceleration, the hubs 158A, 158B cause the rollers 168A, 168B to wedge between the reverse cam surfaces and the outer surfaces 160 of the hubs 158A, 158B. The reverse cam surface engagement enables an engine braking or back driving effect, when available, whereby the reduced speed of the input gear slows or brakes the drive axles.

Providing two separate roller assemblies 164A, 164B, each having a set of rollers 168A, 168B associated with one of the hubs 158A, 158B, allows overrunning of one hub 158A, 158B while maintaining positive driving engagement of the other hub 158A, 158B. For example, in a wheeled vehicle in which the hubs 158A, 158B drive wheels on opposite sides of the vehicle, when the vehicle travels around a curve, the wheel on the inside of the curve has a shorter distance to travel, and thus travels at a slower speed, than the wheel on the outside of the curve. Consequently, when the housing 152 is being rotationally driven while the vehicle is in a curve, one hub 158A, 158B, for example hub 158A, associated with the inside wheel will continue to be driven, with its rollers 168A engaged between the outer surface 160 of the hub 158A and the forward cam surfaces of the inner surface 156 of the housing 152, while the other hub 158B, for example hub 158B, associated with the outside wheel will be allowed to overrun, turning faster than the housing 152, such that its rollers 168b disengage from their wedging between the inner cam surface 156 and the outer surface 160 of the hub 158B, thus allowing the hub 158B to freely rotate as it is driven by the outside wheel. When the vehicle returns to a straight path and the speed of the disengaged hub 158B slows down to equal the speed of the housing 152, the rollers 168B surrounding the hub 158B re-engage (wedge) between the forward cam surfaces and hub 158A, 158B so that the hub 158B is once again driven to rotate at the same speed as the housing 152.

However, because the rear differential 26 uses a split roll cage, if the two roller assemblies 164A, 164B were completely decoupled, there is the potential that the rollers 168B associated with the overrunning hub 158B could go into reverse engagement with the reverse cam surfaces of the inner surface 156 of the housing 152, thereby causing the vehicle to act as if it has a solid axle (i.e., one axle being driven by the housing 152, while the other axle tries to drive the housing 152). To overcome potential reverse engagement of an overrunning hub, the rear differential 26 includes a roll cage coupler 170 positioned between the two roller assemblies 164A, 164B. The coupler 170 includes a hub 172 with a plurality of teeth 173 extending radially outward from the hub 172. The number of teeth preferably matches the number of slots and the number of rollers 168A, 168B in each roll cage 166A, 166B. The teeth of the coupler 170 preferably fit into the slots in each roll cage 166A, 166B. The width of the portion of each tooth within a slot is slightly less than the width of the slot of the roll cages 166A, 166B such that a gap is present. This gap is designed to permit the roll cages 166A, 166B to shift or index so that the rollers 168A, 168B are positioned to engage with the cam surface, but the gap is not large enough to permit the other roll cage 166A, 166B to index in the opposite direction. Accordingly, by using an intermittent coupler 170, the split cage design prevents the issue of one set of rollers engaging the forward cam surface to drive one axle and the other set of rollers engaging the reverse cam surface to be driven by the other axle.

Rotationally coupling together two separate roll cages 166A, 166B with an intermittent coupler 170 allows each roll cage 166A, 166B to move axially with respect to its associated hub 158A, 158B, which enables a compact and simple friction disk mechanism to index each roll cage 166A, 166B relative to its associated hub 158A, 158B. The intermittent coupler also allows for a large torque difference from one axle to the other, and also allows for larger manufacturing tolerances in the clutch cam profile and hub diameters. The intermittent coupler also provides a method for retaining the roll assemblies in axial position so to prevent one set from contacting the other.

End caps 174A, 1748 are attached to each end of the housing 152 so as to rotate with the housing 152. In some embodiments and as illustrated, the end cap 174A is formed together with the flange 154. The end caps 174A, 1748 are coupled to bearings 176A, 176B, respectively. To assist in indexing the roller assemblies 164A, 164B to their corresponding hubs 158A, 158B, the end caps 174A, 1748 are associated with friction disk mechanisms 178A, 178B, respectively. The friction disk mechanisms 178A, 178B create a frictional engagement with the roller assemblies 164A, 164B and the hubs 158A, 158B, respectively, so that the roll cages 166A, 166B rotate with the hubs 158A, 158B when both hubs 158A, 158B are rotating. In combination, the friction disk mechanisms 178A, 178B and the roll cage coupler 170 make up an indexing assembly.

Each friction disk mechanism 178A, 178B may include a friction plate or disk 180 that is attached to, formed on, or engaged with the roll cage 166A, 166B so as to rotate in combination with the roll cage 166A, 166B. The friction plate 180 can be permanently or removably attached to the roll cage 166A, 166B, or may simply be a surface on the roll cage 166A, 166B. In one embodiment, the friction plate 180 is a substantially planar annular ring with radially extending tabs or teeth that are sized to extend into the slots on the roll cage 166A, 166B when the friction plate 180 is placed on the roll cage 166A, 166B and adjacent to an inside end surface of the roll cage 166A, 166B. The friction plate 180 is configured to provide a frictional engagement with a portion of the hubs 158A, 158B. More specifically, in one embodiment, the hubs 158A, 158B include a contact surface 181, which may be integral with, formed on, or attached to the hub, preferably on an axial end surface of the hub so as to be adjacent to a portion of the friction plate 180. The portions of the friction plate 180 and the contact surface 181 that contact one another preferably have a sufficient coefficient of friction to create frictional contact for transferring torque between the two.

Springs 182 are compressed between bushings 184 and end surfaces of the roll cages 166A, 166B. In the depicted embodiment, the springs 182 are wave springs. The springs 182 bias the roll cages 166A, 166B, and thus the friction plate 180, into the contact surfaces 181 of the hubs 158A, 158B. As such, the springs 182 cause the roll cages 166A, 166B to move axially with respect to the hubs 158A, 158B, respectively, thereby urging the friction plate 180 into frictional engagement with the hubs 158A, 158B.

System Operation

Figure 19:
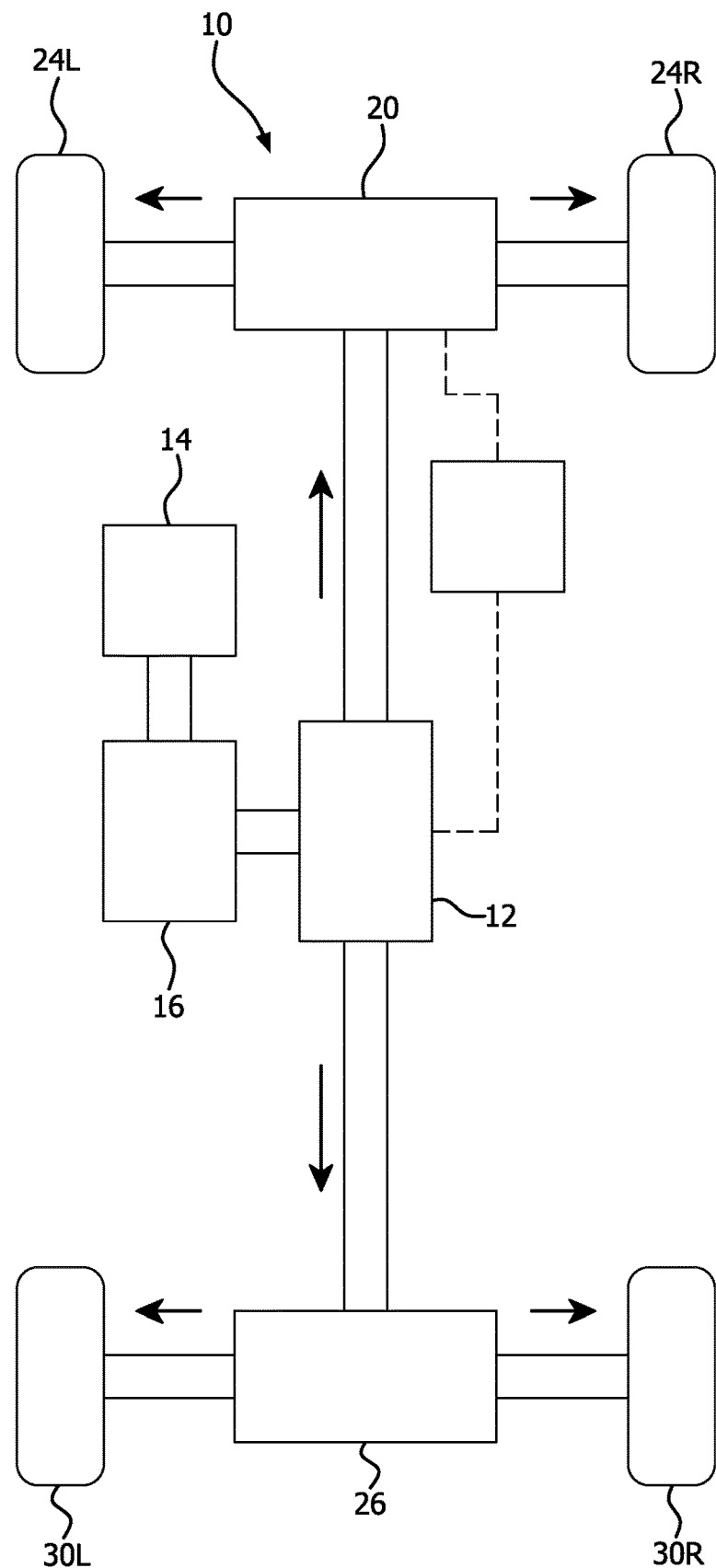
FIG. 19 is a schematic representation of operation of the drive system of FIG. 1 when traction is present at all four wheels as denoted by the arrows.
Figure 20:
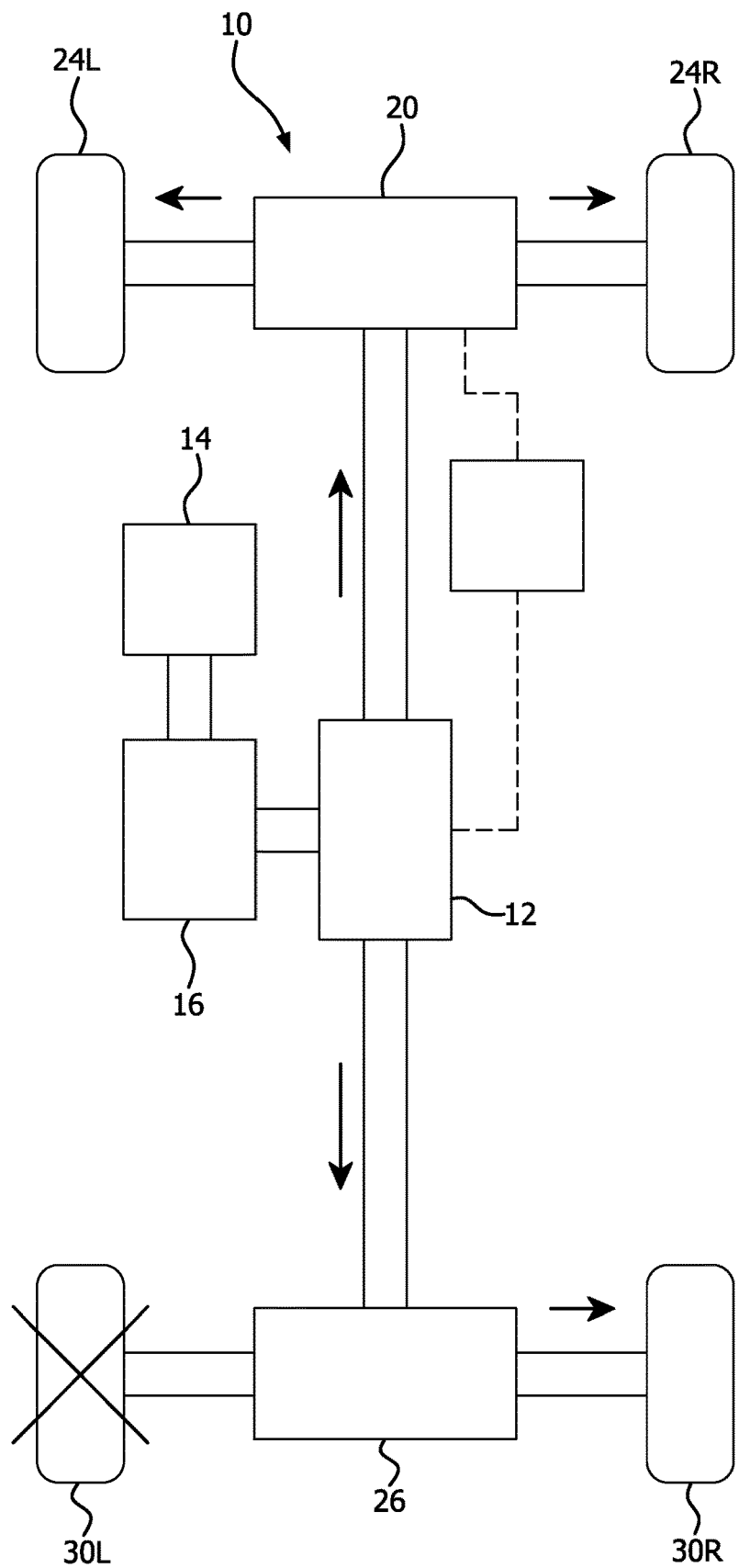
FIG. 20 is a schematic representation of operation of the drive system of FIG. 1 when traction is present at three wheels and absent at one wheel.
Figure 21:
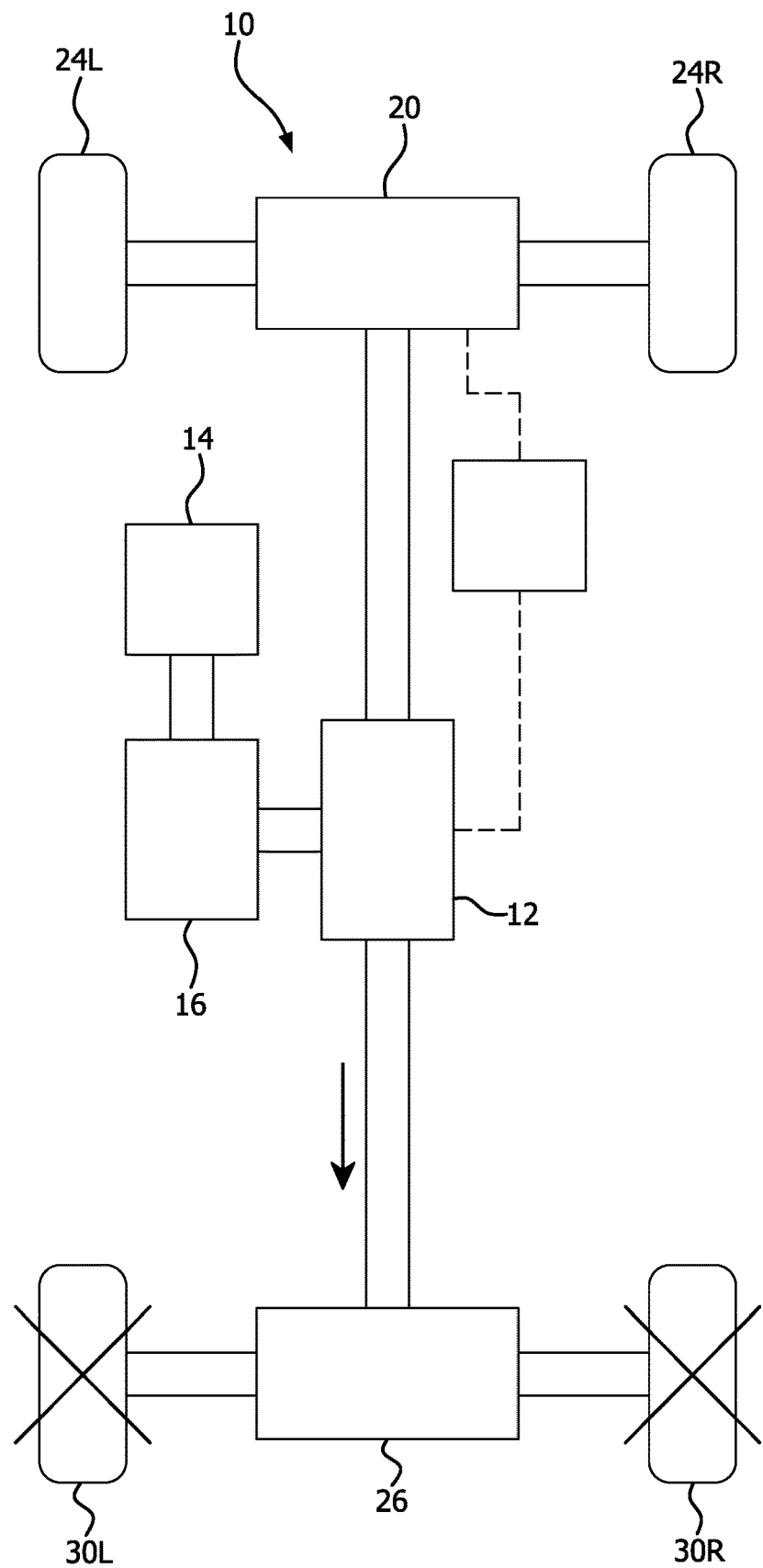
FIG. 21 is a schematic representation of operation of the drive system of FIG. 1 when traction is present at two wheels on a common axle, absent at two wheels on the other axle, and the center differential is in an unlocked configuration.
Figure 22:
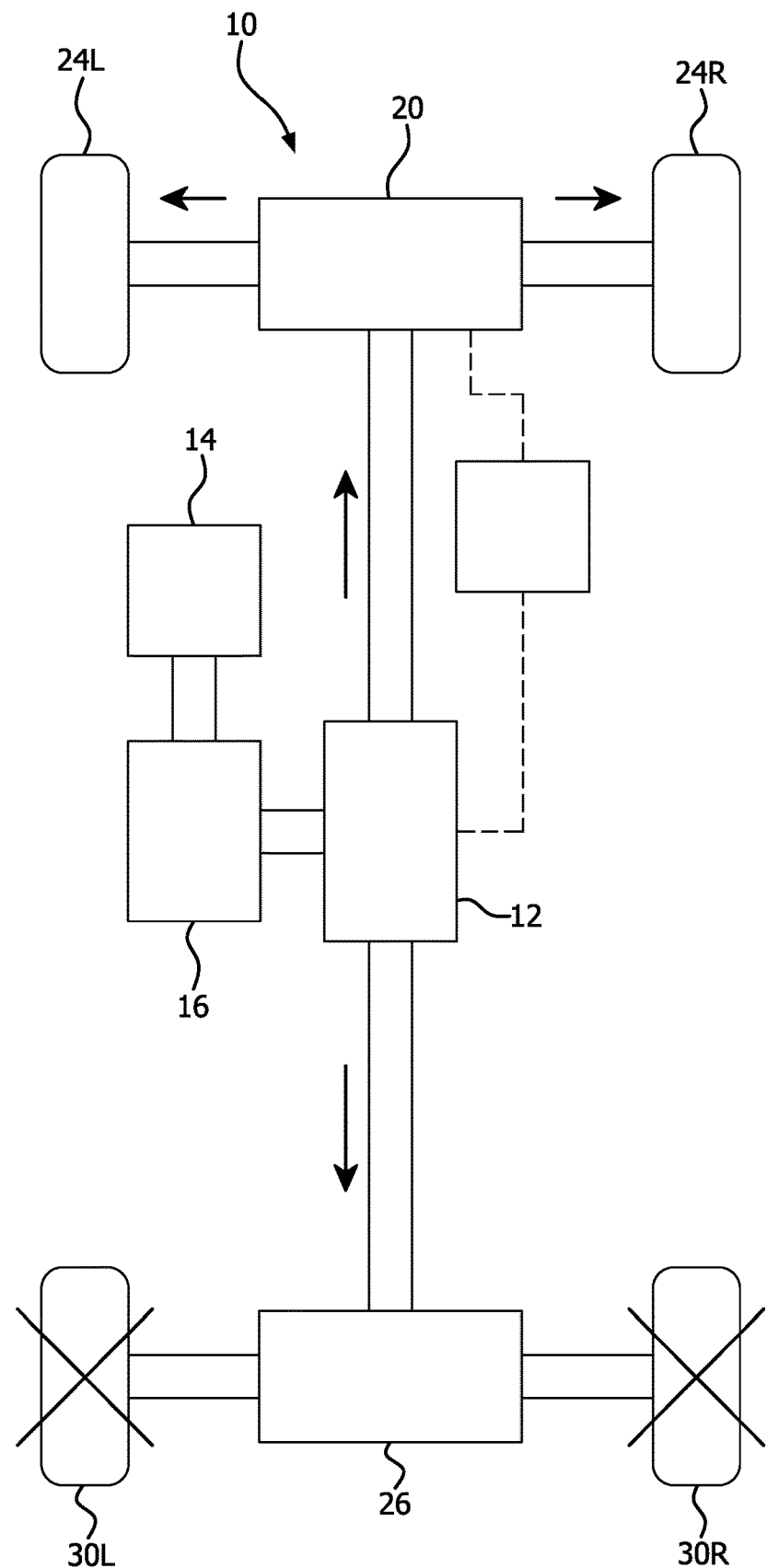
FIG. 22 is a schematic representation of operation of the drive system of FIG. 1 when traction is present at two wheels on a common axle, absent at two wheels on the other axle, and the center differential is in a locked configuration.
Figure 23:
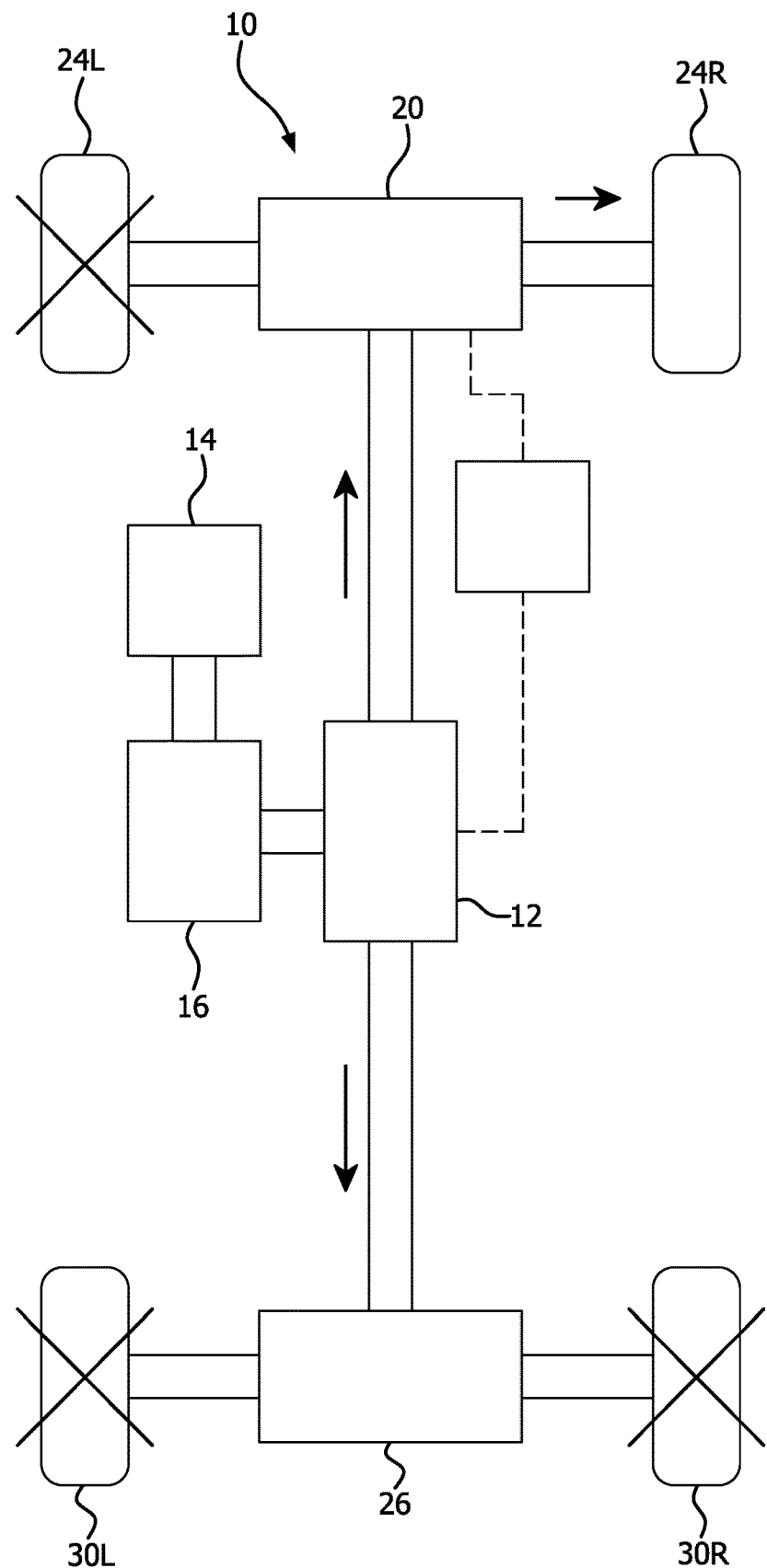
FIG. 23 is a schematic representation of operation of the drive system of FIG. 1 when traction is present at one wheel, and absent at three wheels, and the center differential is in the locked configuration.

The drive system 10 is capable of providing power to at least one of the wheels 24L, 24R, 30L, and 30R in various situations. For example and referring to FIG. 19, when traction is present at all four wheels 24L, 24R, 30L, and 30R, the system 10 provides power to all four wheels 24L, 24R, 30L, and 30R and the center differential 12 may be in either the unlocked configuration or the locked configuration. As another example and referring to FIG. 20, when traction is present at three wheels (illustratively, the front wheels 24L, 24R and the rear right wheel 30R) and absent at one wheel (illustratively, the rear left wheel 30L), the system 10 provides power to the three wheels (illustratively, the front wheels 24L, 24R and the rear right wheel 30R) and the center differential 12 may be in the unlocked or locked configuration. Referring to FIG. 21, when traction is present at two wheels on a common axle (illustratively, the front wheels 24L, 24R) and absent at the other two wheels (illustratively, the rear wheels 30L, 30R) and if the center differential 12 is in the unlocked configuration, the system 10 provides power to the other two wheels (illustratively, the rear wheels 30L and 30R), which causes the other two wheels to slip and spin, which in turn causes no movement of the first two wheels (illustratively, the front wheels 24L and 24R). However, and referring to FIG. 22, when traction is present at two wheels on a common axle (illustratively, the front wheels 24L, 24R) and absent at the other two wheels (illustratively, the rear wheels 30L, 30R) and if the center differential 12 is in the locked configuration, the system 10 provides power to all wheels. As another example and referring to FIG. 23, when traction is present at one wheel (illustratively, the front right wheel 24R) and absent at three wheels (illustratively, the front left wheel 24L and the rear wheels 30L, 30R) and the center differential 12 is in the locked configuration, the system 10 provides power to all of the wheels, but that power is only usable to propel the vehicle by the wheel with traction (illustratively, the front right wheel 24R). The drive system 10 may be reconfigured from the unlocked configuration to the locked configuration or vice versa upon actuation of one or more user manipulated controls (for example, on/off switches or buttons).

The drive system 10 advantageously provides one or more various benefits compared to other systems. For example, the drive system 10 does not require computer controls, sensors, friction plate clutches, or associated electric motor actuators or hydraulics. As another example, the drive system 10 more efficiently transfers power to drive a vehicle; in contrast, in other systems efficiency losses occur when power is directed to the wheel without traction and heat losses occur upon clutch plate actuation. As another example, the drive system 10 does not require wear or heat mitigation for friction plate clutch material. As yet another example, the drive system 10 requires less time to redistribute power to the wheels; in contrast, other systems require more time to redistribute power due to the need to actuate plate clutch packs via hydraulics or electric actuators.

Figure 24:
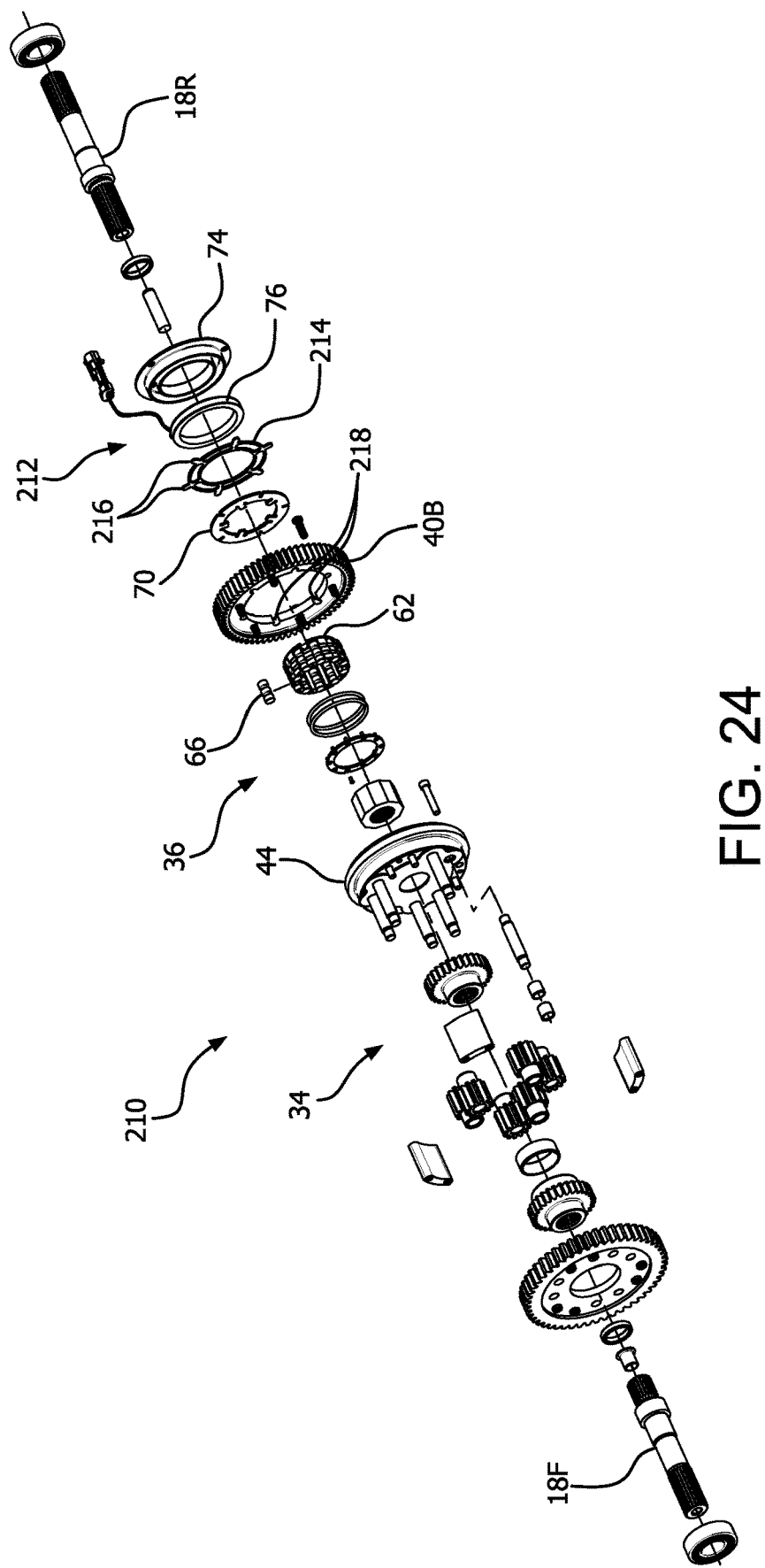
FIG. 24 is an exploded perspective view of internal components of a center differential according to another embodiment of the present invention, and a housing of the differential is omitted for clarity.
Figure 25:
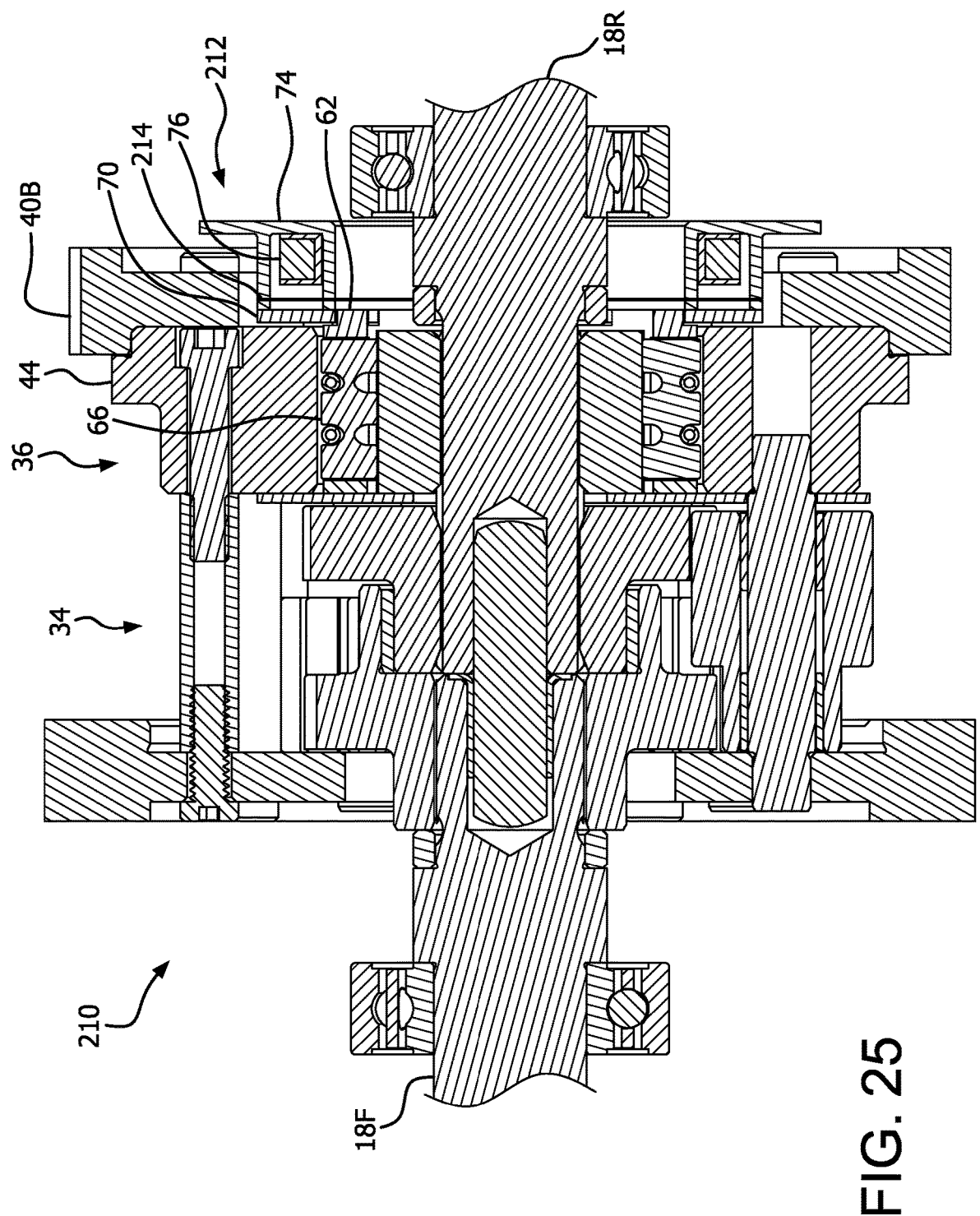
FIG. 25 is a partial side sectional view of the internal components of the center differential of FIG. 24.

Drive systems according to embodiments of the present invention may be modified from the systems described above. For example and referring now to FIGS. 24 and 25, a center differential 210, which may be used in a drive system instead of the center differential 12, illustrated. The center differential 210 is similar to the center differential 12, and similar components are illustrated with the same reference numbers. Generally, the center differential 210 includes an open differential assembly 34 and a bi-directional overrunning roller clutch 36 as described above. The center differential 210 also includes an electromagnet assembly 212 for engaging the bi-directional overrunning roller clutch 36 and thereby locking the open differential assembly 34. The electromagnet assembly 212 includes an electromagnet housing 74 that carries an electromagnet or coil 76 as described above. When the electromagnet assembly 212 is energized, the coil 76 attracts a second armature plate 214, which transfers magnetic flux to the first armature plate 70. The second armature plate 214 also engages the second ring gear 40B (for example, by including protrusions 216 received in recesses 218 on the second ring gear 40B. This results in a connection from the second ring gear 40B through the second armature plate 214 and the first armature plate 70 to the roll cage 62, causing it to resist rotation. In this configuration if the cammed hub 60 is rotating faster than either ring gear 40A and 40B while the coil 76 is energized, the cammed hub 60 and the second armature plate 214 will drag the first armature plate 70, causing the roll cage 62 to rotate relative to the hub 60 and index into an engaged position where the rolls 66 wedge between the cams on the hub 60 and the inner bore of the clutch housing 44. If the second ring gear 40B and therefore the clutch housing 44 is rotating faster than the cammed hub 60 while the coil 76 is energized, the second armature plate 214 will be turning faster than the first armature plate 70. The magnetic force and friction acting between the two plates 70, 214 will cause the second armature plate 214 to rotate the first armature plate 70, which rotates the roll cage 62 and changes the relative position of the rolls 66 relative to the cams on the hub 60, thereby locking the rolls 66 between the cams and inner surface of the clutch housing 44 so as to transmit torque between the ring gear 40B and the drive shafts 18F, 18R.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A drive system for a four-wheel drive vehicle, four wheel drive vehicle having first and second front driven axles, each of the front driven axles connected to a respective front wheel, first and second rear driven axles, each of the rear driven axles connected to a respective rear wheel, and a transmission for generating power for rotating each of the front wheels and rear wheels depending on the operating state of the vehicle, the drive system comprising:

a front differential connected to the first and second front driven axles for transmitting torque to the front wheels;
a rear differential connected to the first and second rear driven axles for transmitting torque to the rear wheels;
a center differential connected to the transmission for transmitting power from the transmission to a first shaft and a second shaft, the first shaft connected to the center differential and the front differential, and the second shaft connected to center differential and the rear differential; and
an electronic controller for controlling operation of the front and center differentials;
the center differential comprising:
   an open planetary gear differential assembly comprising:
   at least one ring gear coupled to the transmission and configured to be rotatably driven by the transmission;
   a first sun gear configured to be rotatably driven by the ring gear, the first sun gear configured to rotatably drive the first shaft;
   a second sun gear configured to be rotatably driven by the ring gear, the second sun gear configured to rotatably drive the second shaft;
   a planetary carrier configured to rotate together with the ring gear;
   a plurality of posts carried by the planetary carrier;
   a plurality of first planetary gears rotatably carried by the plurality of posts, the plurality of first planetary gears meshably engaging the first sun gear; and
   a plurality of second planetary gears rotatably carried by the plurality of posts, the plurality of second planetary gears meshably engaging the second sun gear, and each of the second planetary gears meshably engaging one of the first planetary gears;
   wherein the open planetary gear differential assembly has an unlocked configuration and a locked configuration, in the unlocked configuration the open planetary gear differential assembly permitting differentiation between the first sun gear and the second sun gear, and in the locked configuration the first sun gear and the second sun gear rotating in combination with each other;
a center differential bi-directional overrunning clutch comprising:
   a center differential clutch housing formed on or coupled to the ring gear and being rotatable in combination with the ring gear, the center differential clutch housing comprising an inner surface;
   a hub disposed within the clutch housing and engaged with the second shaft, the hub configured to rotate in combination with the second output gear and the second shaft;
   a roll cage assembly disposed between the inner surface of the clutch housing and the hub, the roll cage assembly comprising a roll cage and a plurality of rollers carried by the roll cage;
   wherein the bi-directional overrunning clutch is engageable to cause the plurality of rollers to wedge between the inner surface of the clutch housing and the hub, the hub and the clutch housing thereby being rotatable in combination and causing the open differential to occupy the locked configuration, and wherein the bi-directional overrunning clutch is disengageable to permit relative rotation between the hub and the clutch housing and thereby permit the open differential to occupy the unlocked configuration; and
   an electromagnet assembly mounted adjacent to the roll cage assembly, the electromagnet assembly configured to be energized to cause engagement of the bi-directional overrunning clutch and thus control of the center differential between the locked and unlocked configuration;
wherein the front differential is configured to transmit power from the first shaft to the first front driven shaft and the second front driven shaft, the front differential comprising:
   a front ring gear located within a differential case, the ring gear connected to the first shaft;
   a front clutch housing formed on or attached to the front ring gear and configured to rotate in combination therewith;
   two front hubs positioned within the front clutch housing, one front hub connected to an end of the first front driven axle and the other front hub connected to an end of the second front driven axle;
   a front roll cage assembly located within the front clutch housing, between an outer surface of each front hub and an inner surface of the front clutch housing, the front roll cage assembly including a front roll cage with a plurality of rollers, each roller being rotatably disposed within a slot formed in the cage, one or more springs bias the rollers into a neutral or central position within the slots, the plurality of rollers are grouped into two sets, each set of rollers is located adjacent to the outer surface of one of the front hubs, one of either the outer surfaces of the front hubs or the inner surface of the front clutch housing includes a contoured cam surface;
   a front electromagnet assembly includes at least first and second indexing devices electrically connected to the electronic controller, each indexing device includes an electromagnetic coil assembly, the first indexing device is configured, when activated, to cause the roll cage to index into an active drive state where the rollers in each set of rollers are positioned to cause the first shaft to be coupled to the first and second front driven axles when four-wheel drive capability is needed, the second indexing device is configured, when activated, to cause the roll cage to index into an active backdrive state which is rotationally opposite from the active drive state so that the rollers in each set of rollers are positioned to cause the first and second front driven axles to be coupled to the first shaft for providing torque transfer from the first and second front driven shafts to the first shaft during an engine braking condition; and
   a front spring assembly biases the roll cage into a neutral position between the active drive state and the active backdrive state;
wherein the rear differential is configured to transmit power from the second shaft to the first rear driven shaft and the second rear driven shaft, the rear differential comprising:
   a rear gear engaged with the second shaft;
   a rear housing attached to or formed on the rear gear so as to rotate in combination therewith, the rear housing includes a generally cylindrical inner surface;
   a pair of rear hubs are located within the rear housing radially inward of the inner surface, the rear hubs are substantially coaxially aligned with each other and adapted to rotate about a common axis within the rear housing, one rear hub is engaged with an end of the first rear driven axle, and the other rear hub is engaged with an end of the second rear driven axle, one of either the inner surface of the rear housing or an outer surface of each rear hub includes a rear cam surface; and a rear roll cage assembly is located within the rear housing between the outer surfaces of the rear hubs and the inner surface of the rear housing, the rear roll cage assembly including a roll cage with a plurality of rollers, each roller being rotatably disposed within a slot formed in the cage, one or more springs bias the rollers into a neutral or central position within the slots, the plurality of rollers are grouped into two sets, each set of rollers is located adjacent to the outer surface of one of the hubs, one of either the outer surfaces of the hubs or the inner surface of the clutch housing includes a contoured cam surface;

wherein the rear roll cage is biased so that rollers engage with the rear cam surface when torque is transmitted from the rear clutch housing to the rear hubs; and wherein the electronic controller is connected to and configured to activate and deactivate the electromagnet assembly in the center differential and to activate and deactivate the first and second indexing devices in the front differential, wherein (i) when two wheel drive mode is desired, the electronic controller is configured such that the electromagnetic assembly in the center differential is activated so that the center differential is in its locked configuration, and the first and second indexing devices are not activated, (ii) when on-demand four wheel drive is desired, the electronic controller is configured such that the electromagnetic assembly in the center differential is activated so that the center differential is in its locked configuration, and the first indexing device is activated into an active drive state, and (iii) when full time four wheel drive mode is desired, the electronic controller is configured such that the electromagnetic assembly in the center differential is deactivated so that the center differential is in its unlocked configuration, and the second indexing device is activated into an active backdrive state.

2. The drive system of claim 1, wherein in the center differential: the hub comprises a plurality of cam surfaces, and wherein the bi-directional overrunning clutch is engageable to cause the plurality of rollers to wedge between the inner surface of the clutch housing and plurality of cam surfaces of the hub.

3. The drive system of claim 1, wherein in the center differential: the clutch housing comprises a plurality of cam surfaces, and wherein the bi-directional overrunning clutch is engageable to cause the plurality of rollers to wedge between the outer surface of the hub and plurality of cam surfaces of the clutch housing.

4. The drive system of claim 1, wherein in the center differential: the planetary carrier comprises the clutch housing.

5. The drive system of claim 4, wherein in the center differential: the ring gear is a first ring gear, and wherein the open planetary gear differential assembly further comprises a second ring gear configured to be rotatably driven by the transmission, the second ring gear configured to rotate together with the first ring gear and the planetary carrier.

6. The drive system of claim 1, wherein in the center differential: the bi-directional overrunning clutch includes an armature plate engaged with the roll cage, and the electromagnet assembly includes a coil located in close proximity to the armature plate, the coil is configured to receive electrical power from the electronic controller so as to magnetically attract the armature plate thereby indexing the roll cage.

7. A drive system for a four-wheel drive vehicle, four wheel drive vehicle having first and second front driven axles, each of the front driven axles connected to a respective front wheel, first and second rear driven axles, each of the rear driven axles connected to a respective rear wheel, and a transmission for generating power for rotating each of the front wheels and rear wheels depending on the operating state of the vehicle, the drive system comprising:

a front differential connected to the first and second front driven axles for transmitting torque to the front wheels;

a rear differential connected to the first and second rear driven axles for transmitting torque to the rear wheels;

a center differential connected to the transmission for transmitting power from the transmission to a first shaft and a second shaft, the first shaft connected to the center differential and the front differential, and the second shaft connected to center differential and the rear differential; and an electronic controller for controlling operation of the front and center differentials;

the center differential having a locked configuration and an unlocked configuration, the center differential comprising:

an open planetary gear differential assembly comprising:

at least one ring gear coupled to the transmission and configured to be rotatably driven by the transmission;

a first sun gear configured to be rotatably driven by the ring gear, the first sun gear configured to rotatably drive the first shaft;

a second sun gear configured to be rotatably driven by the ring gear, the second sun gear configured to rotatably drive the second shaft;

a planetary carrier configured to rotate together with the ring gear;

a plurality of posts carried by the planetary carrier;

a plurality of first planetary gears rotatably carried by the plurality of posts, the plurality of first planetary gears meshably engaging the first sun gear; and a plurality of second planetary gears rotatably carried by the plurality of posts, the plurality of second planetary gears meshably engaging the second sun gear, and each of the second planetary gears meshably engaging one of the first planetary gears wherein the open differential assembly permits differentiation between the first sun gear and the second sun gear;

a center differential bi-directional overrunning clutch comprising:

a clutch housing formed on or coupled to the ring gear and being rotatable in combination with the ring gear, the center differential clutch housing comprising an inner surface;

a hub disposed within the clutch housing and engaged with the second shaft, the hub configured to rotate in combination with the second output gear and the second shaft; and a roll cage assembly disposed between the inner surface of the clutch housing and the hub, the roll cage assembly comprising a roll cage and a plurality of rollers carried by the roll cage;
wherein the center differential bi-directional overrunning clutch is engageable to cause the plurality of rollers to wedge between the inner surface of the clutch housing and the hub, the hub and the clutch housing thereby being rotatable in combination and causing the first sun gear and the second sun gear to rotate in combination with each other; and
an electromagnet assembly mounted adjacent to the roll cage assembly, the electromagnet assembly configured to be energized to cause the engagement of the bi-directional overrunning clutch and thus control activation of the center differential between its locked and unlocked configuration;
wherein the front differential is configured to transmit power from the first shaft to the first front driven shaft and the second front driven shaft, the front differential comprising:
a front ring gear located within a differential case, the ring gear connected to the first shaft;
a front clutch housing formed on or attached to the front ring gear and configured to rotate in combination therewith;
two front hubs positioned within the front clutch housing, one front hub connected to an end of the first front driven axle and the other front hub connected to an end of the second front driven axle;
a front roll cage assembly located within the front clutch housing, between an outer surface of each front hub and an inner surface of the front clutch housing, the front roll cage assembly including a front roll cage with a plurality of rollers, each roller being rotatably disposed within a slot formed in the cage, one or more springs bias the rollers into a neutral or central position within the slots, the plurality of rollers are grouped into two sets, each set of rollers is located adjacent to the outer surface of one of the front hubs, one of either the outer surfaces of the front hubs or the inner surface of the front clutch housing includes a contoured cam surface;
a front electromagnet assembly includes at least first and second indexing devices electrically connected to the electronic controller, each indexing device includes an electromagnetic coil assembly, the first indexing device is configured, when activated, to cause the roll cage to index into an active drive state where the rollers in each set of rollers are positioned to cause the first shaft to be coupled to the first and second front driven axles when four-wheel drive capability is needed, the second indexing device is configured, when activated, to cause the roll cage to index into an active backdrive state which is rotationally opposite from the active drive state so that the rollers in each set of rollers are positioned to cause the first and second front driven axles to be coupled to the first shaft for providing torque transfer from the first and second front driven shafts to the first shaft during an engine braking condition; and
a front spring assembly biases the roll cage into a neutral position between the active drive state and the active backdrive state; and
wherein the rear differential is configured to transmit power from the second shaft to the first rear driven shaft and the second rear driven shaft, the rear differential comprising:
a rear gear engaged with the second shaft,
a rear housing attached to or formed on the rear gear so as to rotate in combination therewith, the rear housing includes a generally cylindrical inner surface;
a pair of rear hubs are located within the rear housing radially inward of the inner surface, the rear hubs are substantially coaxially aligned with each other and adapted to rotate about a common axis within the rear housing, one rear hub is engaged with an end of the first rear driven axle, and the other rear hub is engaged with an end of the second rear driven axle, one of either the inner surface of the rear housing or an outer surface of each rear hub includes a rear cam surface; and
a rear roll cage assembly is located within the rear housing between the outer surfaces of the rear hubs and the inner surface of the rear housing, the rear roll cage assembly including a roll cage with a plurality of rollers, each roller being rotatably disposed within a slot formed in the cage, one or more springs bias the rollers into a neutral or central position within the slots, the plurality of rollers are grouped into two sets, each set of rollers is located adjacent to the outer surface of one of the hubs, one of either the outer surfaces of the hubs or the inner surface of the clutch housing includes a contoured cam surface;
wherein the rear roll cage is biased so that rollers engage with the rear cam surface when torque is transmitted from the rear clutch housing to the rear hubs; and
wherein the electronic controller is connected to and configured to activate and deactivate the electromagnet assembly in the center differential and to activate and deactivate the first and second indexing devices in the front differential, wherein (i) when two wheel drive mode is desired, the electronic controller is configured such that the electromagnetic assembly in the center differential is activated so that the center differential is in its locked configuration, and the first and second indexing devices are not activated, (ii) when on-demand four wheel drive is desired, the electronic controller is configured such that the electromagnetic assembly in the center differential is activated so that the center differential is in its locked configuration, and the first indexing device is activated into an active drive state, and (iii) when full time four wheel drive mode is desired, the electronic controller is configured such that the electromagnetic assembly in the center differential is deactivated so that the center differential is in its unlocked configuration, and the second indexing device is activated into an active backdrive state.

8. The drive system of claim 7, wherein in the center differential: the hub comprises a plurality of cam surfaces, and wherein the bi-directional overrunning clutch is engageable to cause the plurality of rollers to wedge between the inner surface of the clutch housing and plurality of cam surfaces of the hub.

9. The drive system of claim 7, wherein in the center differential: the clutch housing comprises a plurality of cam surfaces, and wherein the bi-directional overrunning clutch is engageable to cause the plurality of rollers to wedge between the outer surface of the hub and the plurality of cam surfaces of the clutch housing.

10. The drive system of claim 7, wherein in the center differential: the planetary carrier includes the clutch housing.

11. The drive system of claim 10, wherein in the center differential: the ring gear is a first ring gear, and wherein the open differential assembly further comprises a second ring gear configured to be rotatably driven by the transmission, the second ring gear configured to rotate together with the first ring gear and the planetary carrier.

12. The drive system of claim 7, wherein in the center differential:
- wherein the at least one ring gear is first and second ring gears;
- wherein the bi-directional overrunning clutch includes a first and second armature plate, the first armature plate engaged with the roll cage, and the second armature plate is located adjacent to the first armature plate and is engaged with the second ring gear; and
- wherein the electromagnet assembly includes a coil located in close proximity to the second armature plate, the coil configured to receive electrical power from the electronic controller so as to magnetically attract the second and first armature plates, the magnetic attraction connecting the second ring gear to the roll cage through the first and second armature plates, wherein if the hub is rotating faster than either the first or second ring gear while the coil is receiving electrical power, the hub and the second armature plate will cause the first armature plate to rotate relative to the hub and index the roll cage into an engaged position where the rollers are positioned to wedge between the hub and the clutch housing; and wherein if the second ring gear is rotating faster than the hub while the coil is receiving electrical power, the second armature plate will cause the first armature plate to rotate the roll cage and cause the rollers to wedge between the clutch housing and the hub so as to transmit torque between the second ring gear and the drive shafts.

* * * * *

UNITED STATES PATENT AND TRADEMARK OFFICE
CERTIFICATE OF CORRECTION

PATENT NO. : 11,236,811 B1
APPLICATION NO. : 17/136684
DATED : February 1, 2022
INVENTOR(S) : John Michael Hasson, Jr., Howard J. Knickerbocker and James E. Palmer It is certified that error appears in the above-identified patent and that said Letters Patent is hereby corrected as shown below:

In the Claims

Claim 1, Column 20, Line 54: after "assembly", change "biases" to "biasing"

Claim 1, Column 21, Line 13: after "springs", change "bias" to "biasing"

Claim 7, Column 22, Line 64: after "second", change "output" to "sun"

Claim 7, Column 23, Line 60: after "assembly", change "bias" to "biasing"

Claim 7, Column 24, Line 19: after "springs", change "bias" to "biasing"

Claim 12, Column 25, Line 7: delete "wherein"

Claim 12, Column 25, Line 9: delete "wherein"

Claim 12, Column 25, Line 14: delete "wherein"

Signed and Sealed this
Seventh Day of February, 2023

*Katherine Kelly Vidal*
Katherine Kelly Vidal
*Director of the United States Patent and Trademark Office*